(12) United States Patent
Kosaka et al.

(10) Patent No.: US 11,897,574 B1
(45) Date of Patent: Feb. 13, 2024

(54) OPERATING DEVICE OF HUMAN-POWERED VEHICLE

(71) Applicant: SHIMANO INC., Sakai (JP)

(72) Inventors: Kentaro Kosaka, Sakai (JP); Kentaro Tanaka, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/079,801

(22) Filed: Dec. 12, 2022

(51) Int. Cl.
*B62K 23/06* (2006.01)

(52) U.S. Cl.
CPC .................................. *B62K 23/06* (2013.01)

(58) Field of Classification Search
None
See application file for complete search history.

(56) References Cited

U.S. PATENT DOCUMENTS

| | | | | |
|---|---|---|---|---|
| 9,145,183 | B2* | 9/2015 | Kosaka | B62K 23/06 |
| 9,326,412 | B2* | 4/2016 | Kosaka | H05K 7/14 |
| 10,370,056 | B2* | 8/2019 | Komatsu | H04W 76/10 |
| 2006/0096404 | A1* | 5/2006 | Wessel | B62K 23/06 |
| | | | | 74/501.6 |

* cited by examiner

*Primary Examiner* — Vicky A Johnson
(74) *Attorney, Agent, or Firm* — MORI & WARD, LLP

(57) ABSTRACT

An operating device comprises a base member, a first switch unit, and a first coupling structure. The first switch unit includes a first base and a first operating member. The first coupling structure couples the base member and the first base such that the first base is adjustable relative to the base member in a first direction and is adjustable relative to the first coupling structure in a first additional direction different from the first direction. The first coupling structure includes a first intermediate member and a first fastener. The first intermediate member is at least partially provided between the base member and the first base to guide the first base relative to the base member in at least one of the first direction and the first additional direction.

29 Claims, 25 Drawing Sheets

OPERATING DEVICE OF HUMAN-POWERED VEHICLE

BACKGROUND

Technical Field

The present invention relates to an operating device of a human-powered vehicle.

Background Information

A human-powered vehicle includes an operating unit including a switch device configured to operate an operated unit. The operating unit is mounted to a body of the human-powered vehicle so that the switch device is operated by the user. However, a preferable orientation of the switch device depends on at least one of a shape of the body of the human-powered vehicle, a size of the user's hand, and an installation position of the operating device. One of objects of the present disclosure is to improve usability of an operating device.

SUMMARY

In accordance with a first aspect of the present invention, an operating device of a human-powered vehicle comprises a base member, a first switch unit, and a first coupling structure. The base member is mountable to a vehicle body of the human-powered vehicle. The first switch unit is configured to be activated in response to a first user operation. The first switch unit includes a first base and a first operating member. The first operating member is movably coupled to the first base from a first rest position to a first operated position in response to the first user operation. The first coupling structure couples the base member and the first base such that the first base is adjustable relative to the base member in a first direction and is adjustable relative to the first coupling structure in a first additional direction different from the first direction. The first coupling structure includes a first intermediate member and a first fastener. The first intermediate member is at least partially provided between the base member and the first base to guide the first base relative to the base member in at least one of the first direction and the first additional direction. The first fastener is configured to fasten the first base to the base member to hold the first intermediate member between the first base and the base member.

With the operating device according to the first aspect, the first coupling structure enables the user to adjust an orientation of the first switch unit in the first direction and the first additional direction. The first intermediate member enables the user to smoothly move the first base relative to the base member in at least one of the first direction and the first additional direction when the user adjusts the orientation of the first switch unit. Thus, it is possible to improve usability of the operating device with a comparatively simple structure.

In accordance with a second aspect of the present invention, the operating device according to the first aspect is configured so that the first coupling structure has: a first fastening state where the first base and the first intermediate member are fastened to the base member by the first fastener; and a first adjustable state where the first base is coupled to the base member by the first fastener to be movable relative to the base member in each of the first direction and the first additional direction.

With the operating device according to the second aspect, the first adjustable state enables the user to adjust the orientation of the first switch unit relative to the base member in each of the first direction and the first additional direction. The first fastening state enables the user to operate the first switch unit in a state where the first base is in the adjusted orientation. Thus, it is possible to improve usability of the operating device with a comparatively simple structure.

In accordance with a third aspect of the present invention, the operating device according to the second aspect is configured so that the first base and the first intermediate member are movable relative to the base member in the first direction in the first adjustable state. The first base is movable relative to the first intermediate member in the first additional direction in the first adjustable state.

With the operating device according to the third aspect, it is possible to reliably guide the first base relative to the base member in the first direction and the first additional direction.

In accordance with a fourth aspect of the present invention, the operating device according to any one of the first to third aspects is configured so that the first intermediate member is contactable with the base member and the first base.

With the operating device according to the fourth aspect, the first intermediate member can stabilize the orientation of the first switch unit relative to the base member and/or a movement of the first base relative to the base member in at least one of the first direction and the first additional direction.

In accordance with a fifth aspect of the present invention, the operating device according to any one of the first to fourth aspects is configured so that the first intermediate member includes a first contact surface and a first additional contact surface. The first contact surface is contactable with the base member to guide the first base and the first intermediate member relative to the base member in the first direction. The first additional contact surface is contactable with the first base to guide the first base relative to the first intermediate member in the first additional direction.

With the operating device according to the fifth aspect, the first contact surface and the first additional contact surface can reliably stabilize the orientation of the first switch unit relative to the base member and/or the movement of the first base relative to the base member in at least one of the first direction and the first additional direction.

In accordance with a sixth aspect of the present invention, the operating device according to the fifth aspect is configured so that the first contact surface has a curved shape extending in the first direction.

With the operating device according to the sixth aspect, the first contact surface can reliably stabilize the orientation of the first switch unit relative to the base member and/or the movement of the first base relative to the base member in the first direction.

In accordance with a seventh aspect of the present invention, the operating device according to the fifth or sixth aspect is configured so that the first additional contact surface has a flat shape extending in the first additional direction.

With the operating device according to the seventh aspect, the first additional contact surface can reliably stabilize the orientation of the first switch unit relative to the base member and/or the movement of the first base relative to the base member in the first additional direction.

In accordance with an eighth aspect of the present invention, the operating device according to any one of the first to seventh aspects is configured so that the first switch unit includes a first electrical switch at least partially provided between the first base and the first operating member to be activated in response to a movement of the first operating member relative to the first base.

With the operating device according to the eighth aspect, the first electrical switch convers the first user operation into an electric signal. Thus, it is possible to operate an electric device based on the first user operation received by the first switch unit.

In accordance with a ninth aspect of the present invention, the operating device according to any one of the first to eighth aspects is configured so that the first fastener is at least partially provided in the first base.

With the operating device according to the ninth aspect, the first fastener can movably support the first base relative to the base member. Thus, it is possible to movably couple the first base and the base member using the first coupling structure.

In accordance with a tenth aspect of the present invention, the operating device according to any one of the first to ninth aspects is configured so that the first fastener is at least partially provided in the first intermediate member.

With the operating device according to the tenth aspect, the first fastener can movably support the first intermediate member relative to the base member. Thus, it is possible to movably couple the first base and the base member using the first coupling structure.

In accordance with an eleventh aspect of the present invention, the operating device according to any one of the first to tenth aspects is configured so that the first base includes a first threaded hole. The first fastener includes a first externally threaded portion engaged with the first threaded hole.

With the operating device according to the eleventh aspect, it is possible to couple the first fastener and the first base with a comparatively simple structure.

In accordance with a twelfth aspect of the present invention, the operating device according to any one of the first to eleventh aspects is configured so that the first intermediate member includes a first hole. The first fastener extends through the first hole.

With the operating device according to the twelfth aspect, it is possible to couple the first fastener and the first intermediate member with a comparatively simple structure.

In accordance with a thirteenth aspect of the present invention, the operating device according to any one of the first to twelfth aspects is configured so that the base member includes a first opening. The first fastener extends through the first opening.

With the operating device according to the thirteenth aspect, it is possible to couple the first fastener and the base member with a comparatively simple structure.

In accordance with a fourteenth aspect of the present invention, the operating device according to any one of the first to thirteenth aspects is configured so that the first coupling structure couples the base member and the first base such that the first base is adjustable relative to the base member about a first axis and is adjustable relative to the first coupling structure about a first additional axis different from the first axis. The first direction is circumferentially defined about the first axis. The first additional direction is circumferentially defined about the first additional axis.

With the operating device according to the fourteenth aspect, it is possible to adjust the orientation of the first switch unit relative to the base member about the first axis and the first additional axis.

In accordance with a fifteenth aspect of the present invention, the operating device according to the fourteenth aspect is configured so that the first intermediate member is at least partially provided between the base member and the first base to guide the first base relative to the base member about at least one of the first axis and the first additional axis.

With the operating device according to the fifteenth aspect, the first intermediate member enables the user to smoothly move the first base relative to the base member about at least one of the first axis and the first additional axis when the user adjusts the orientation of the first switch unit. Thus, it is possible to reliably improve usability of the operating device with a comparatively simple structure.

In accordance with a sixteenth aspect of the present invention, the operating device according to the fourteenth or fifteenth aspect is configured so that the first fastener extends along the first additional axis.

With the operating device according to the sixteenth aspect, it is possible to couple the first base and the base member movably about the first additional axis using the first fastener.

In accordance with a seventeenth aspect of the present invention, the operating device according to any one of the fourteenth to sixteenth aspects is configured so that the first fastener has a first longitudinal center axis and extends along the first longitudinal center axis. The first longitudinal center axis extends along the first additional axis.

With the operating device according to the seventeenth aspect, it is possible to reliably couple the first base and the base member movably about the first additional axis using the first fastener.

In accordance with an eighteenth aspect of the present invention, the operating device according to the seventeenth aspect is configured so that the first longitudinal center axis coincides with the first additional axis.

With the operating device according to the eighteenth aspect, it is possible to more reliably couple the first base and the base member movably about the first additional axis using the first fastener.

In accordance with a nineteenth aspect of the present invention, the operating device according to any one of the fourteenth to eighteenth aspects is configured so that the first axis intersects with the first additional axis.

With the operating device according to the nineteenth aspect, it is possible to adjust the orientation of the first switch unit to a variety of adjusted orientations.

In accordance with a twentieth aspect of the present invention, the operating device according to any one of the fourteenth to nineteenth aspects is configured so that the first axis is perpendicular to the first additional axis.

With the operating device according to the twentieth aspect, it is possible to reliably adjust the orientation of the first switch unit to the variety of adjusted orientations.

In accordance with a twenty-first aspect of the present invention, the operating device according to any one of the fourteenth to twentieth aspects is configured so that the first switch unit includes a first electrical switch at least partially provided between the first base and the first operating member to be activated in response to a pivotal movement of the first operating member relative to the first base. The first operating member is pivotally coupled to the first base about a first pivot axis from the first rest position to the first operated position in response to the first user operation. The first pivot axis is offset from the first axis.

With the operating device according to the twenty-first aspect, it is possible to improve flexibility of the arrangement of the first axis.

In accordance with a twenty-second aspect of the present invention, the operating device according to the twenty-first aspect is configured so that the first pivot axis intersects with the first additional axis.

With the operating device according to the twenty-second aspect, it is possible to adjust a direction of the first user operation to a variety of adjusted directions relative to the base member.

In accordance with a twenty-third aspect of the present invention, the operating device according to the twenty-first or twenty-second aspect is configured so that the first pivot axis is perpendicular to the first additional axis.

With the operating device according to the twenty-third aspect, it is possible to it is possible to adjust a direction of the first user operation to the variety of adjusted directions relative to the base member.

In accordance with a twenty-fourth aspect of the present invention, the operating device according to any one of the first to twenty-third aspects is configured so that the first fastener is integrally provided as a one-piece unitary member.

With the operating device according to the twenty-fourth aspect, it is possible to improve usability of the operating device with a simpler structure.

In accordance with a twenty-fifth aspect of the present invention, the operating device according to any one of the first to twenty-fourth aspects further comprises electronic circuitry and an electric cable. The electronic circuitry is provided to the base member. The electric cable electrically connects the electronic circuitry and the first switch unit.

With the operating device according to the twenty-fifth aspect, it is possible to utilize the activation of the first switch unit in the electronic circuitry.

In accordance with a twenty-sixth aspect of the present invention, the operating device according to any one of the first to twenty-fifth aspects further comprises a first indicator. The first indicator is provided to at least one of the base member, the first switch unit, and the first coupling structure to indicate a relative position between at least two of the base member, the first switch unit, and the first coupling structure.

With the operating device according to the twenty-sixth aspect, the first indicator enables the user to recognize the orientation of the first switch unit relative to the base member.

In accordance with a twenty-seventh aspect of the present invention, the operating device according to the twenty-sixth aspect is configured so that the first indicator includes a first mark, a second mark, and a third mark. The first mark is provided to the base member. The second mark is provided to the first switch unit. The third mark is provided to the first coupling structure.

With the operating device according to the twenty-seventh aspect, the first indicator enables the user to reliably recognize the orientation of the first switch unit relative to the base member.

In accordance with a twenty-eighth aspect of the present invention, the operating device according to any one of the first to twenty-seventh aspects is configured so that the first additional direction is non-parallel to the first direction.

With the operating device according to the twenty-eighth aspect, it is possible to adjust the orientation of the first switch unit to a variety of adjusted orientations relative to the base member.

In accordance with a twenty-ninth aspect of the present invention, the operating device according to any one of the first to twenty-eighth aspects further comprises a second switch unit and a second coupling structure. The second switch unit is configured to be activated in response to a second user operation. The second switch unit includes a second base and a second operating member. The second operating member is movably coupled to the second base from a second rest position to a second operated position in response to the second user operation. The second coupling structure couples the base member and the second base such that the second base is adjustable relative to the base member in a second direction and is adjustable relative to the second coupling structure in a second additional direction different from the second direction. The second coupling structure includes a second intermediate member and a second fastener. The second intermediate member is at least partially provided between the base member and the second base to guide the second base relative to the base member in at least one of the second direction and the second additional direction. The second fastener is configured to fasten the second base to the base member to hold the second intermediate member between the second base and the base member.

With the operating device according to the twenty-ninth aspect, the second coupling structure enables the user to adjust an orientation of the second switch unit in the second direction and the second additional direction. The second intermediate member enables the user to smoothly move the second base relative to the base member in at least one of the second direction and the second additional direction when the user adjusts the orientation of the second switch unit. Thus, it is possible to reliably improve usability of the operating device with a comparatively simple structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
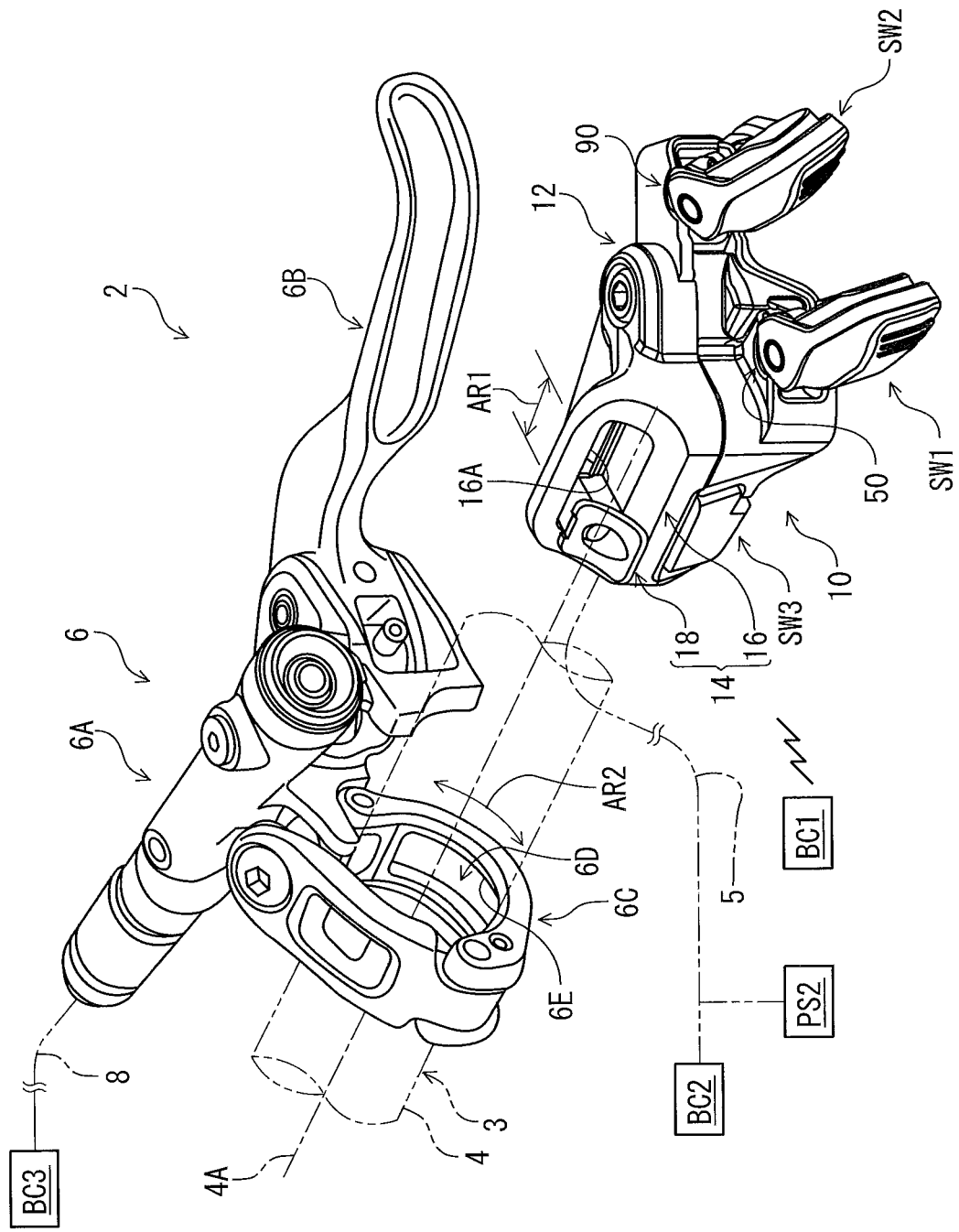
FIG. 1 is a perspective view of an operating device in accordance with one of embodiments and an additional operating device of a human-powered vehicle.

The embodiments will now be described with reference to the accompanying drawings, wherein like reference numerals designate corresponding or identical elements throughout the various drawings.

As seen in FIG. 1, an operating device 10 of a human-powered vehicle 2 is configured to operate at least one device. The operating device 10 is configured to be mounted to a vehicle body 3 of the human-powered vehicle 2. The operating device 10 is configured to be mounted to a tubular part 4 of the vehicle body 3 of the human-powered vehicle 2.

In the present application, the term "human-powered vehicle" includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The operating device 10 is configured to be electrically connected to an electric device BC1. In the present embodiment, the operating device 10 is configured to be connected to the electric device BC1 via a wireless communication channel. The operating device 10 is configured to be wirelessly connected to the electric device BC1.

The operating device 10 is configured to be electrically connected to an electric device BC2. In the present embodiment, the operating device 10 is configured to be connected to the electric device BC2 via a wired communication channel. The operating device 10 is configured to be connected to the electric device BC2 via an electric cable 5.

Examples of the electric devices BC1 and BC2 include an additional or satellite operating device, an adjustable seat-post, a suspension, a gear changing device, a brake device, a lighting device, a display device, a cycle computer, a smartphone, a tablet computer, and a personal computer. In the present embodiment, the electric device BC1 includes a gear changing device such as a derailleur. The electric device BC2 includes a satellite operating device. However, the electric devices BC1 and BC2 are not limited to the above devices.

In the present embodiment, the operating device 10 is a right-hand side operating/control device configured to be operated by the rider's right hand to actuate the electric device BC1 or other devices. However, the structures of the operating device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a steering or a handlebar. Accordingly, these terms, as utilized to describe the operating device 10 or other components, should be interpreted relative to the human-powered vehicle 2 equipped with the operating device 10 as used in an upright riding position on a horizontal surface.

The human-powered vehicle 2 includes an additional operating device 6. The additional operating device 6 is configured to operate at least one component. The additional operating device 6 is configured to be mounted to the tubular part 4 of the human-powered vehicle 2. The additional operating device 6 includes an operating body 6A, an operating lever 6B, and a mounting member 6C. The operating lever 6B is pivotally coupled to the operating body 6A. For example, the operating body 6A includes a hydraulic unit configured to generate a hydraulic pressure in response to a movement of the operating lever 6B. However, the operating body 6A can include structures (e.g., a wire take-up unit configured to take up or release a wire of a mechanical cable) other than the hydraulic unit if needed and/or desired.

The mounting member 6C is configured to couple the operating body 6A to the tubular part 4 of the human-powered vehicle 2. The mounting member 6C includes a mounting opening 6D through which the tubular part 4 of the human-powered vehicle 2 extends in a state where the mounting member 6C couples the operating body 6A to the tubular part 4 of the human-powered vehicle 2. In the present embodiment, the mounting member 6C includes a clamp. However, the structure of the mounting member 6C is not limited to the clamp.

The additional operating device 6 is configured to be connected to an additional electric device BC3. In the present embodiment, the additional operating device 6 is configured to be connected to the additional electric device BC3 via a hydraulic hose 8. However, the additional operating device 6 can be configured to be connected to the additional electric device BC3 via other elements such as a mechanical cable (e.g., Bowden cable).

Examples of the additional electric device BC3 include an adjustable seatpost, a suspension, a gear changing device, and a brake device. In the present embodiment, the additional electric device BC3 includes a hydraulic brake device. However, the additional electric device BC3 is not limited to the above devices.

As seen in FIG. 1, the operating device 10 of the human-powered vehicle 2 comprises a base member 12. The base member 12 is mountable to the vehicle body 3 of the human-powered vehicle 2. The base member 12 is mountable to the tubular part 4 of the vehicle body 3. The tubular part 4 has a longitudinal center axis 4A. The tubular part 4 of the human-powered vehicle 2 extends along the longitudinal center axis 4A.

The operating device 10 further comprises a mounting structure 14. The mounting structure 14 is configured to couple the base member 12 and the mounting member 6C of the additional operating device 6. The mounting structure 14 is configured to couple the base member 12 and the tubular part 4 of the vehicle body 3 via the mounting member 6C of the additional operating device 6. In the present embodiment, the operating device 10 is configured to be mounted to a flat handlebar. However, the mounting structure 14 can be configured to couple the base member 12 and other type of handlebars such as a drop-down handlebar, a time trial handlebar, and a bull horn handlebar if needed and/or desired. The mounting structure 14 can have a structure configured to directly couple the base member 12 and the tubular part 4 of the vehicle body 3 if needed and/or desired.

As seen in FIG. 1, the mounting structure 14 includes a mounting base 16 and an adjustment member 18. The mounting base 16 is secured to the base member 12. The adjustment member 18 is adjustably attached to the mounting base 16 and is configured to adjustably couple the mounting base 16 and the mounting member 6C. In the present embodiment, the mounting structure 14 is configured to couple the base member 12 and the vehicle body 3 such that the base member 12 is positioned in any position within an adjustable range AR1. The mounting structure 14 is configured to couple the base member 12 and the vehicle body 3 such that the base member 12 is positioned in any position within an additional adjustable range AR2. However, the mounting structure 14 can be configured to couple the base member 12 and the vehicle body 3 such that the base member 12 is positioned in any position within only one of the adjustable range AR1 and the additional adjustable range AR2 if needed and/or desired.

Figure 2:
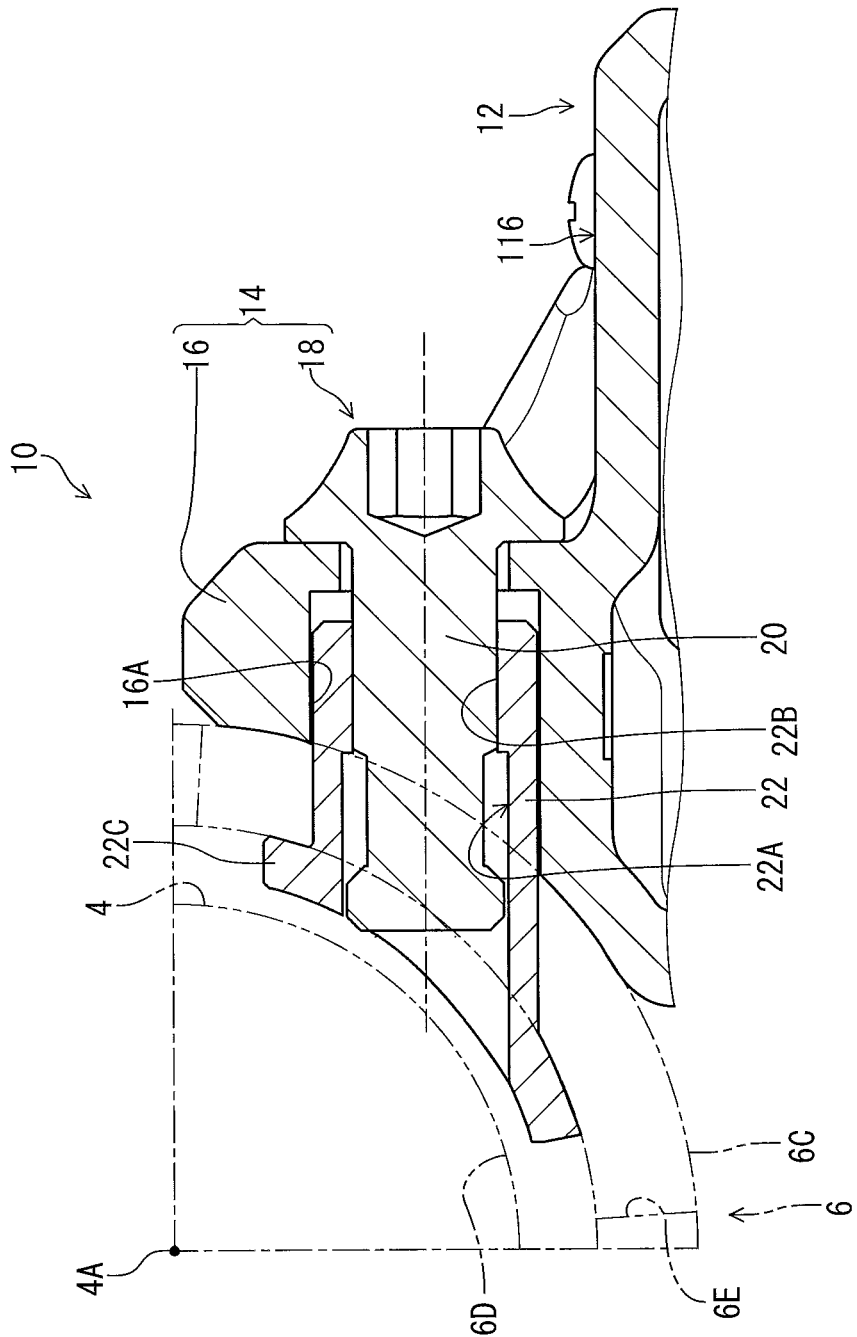
FIG. 2 is a cross-sectional view of the operating device taken along line II-II of FIG. 3.

As seen in FIG. 2, the mounting base 16 is integrally provided with at least part of the base member 12 as a one-piece unitary member. The adjustment member 18 is a separate member from the mounting base 16. The mounting base 16 includes an elongated opening 16A. The adjustment member 18 is movably provided in the elongated opening 16A. The mounting base 16 can be a separate member from at least part of the base member 12 if needed and/or desired.

As seen in FIG. 1, the adjustment member 18 extends through the elongated opening 16A in a mounting state where the base member 12 is fastened to the vehicle body 3 by the mounting structure 14. The adjustment member 18 is movable relative to the base member 12 within the elongated opening 16A in a state where the base member 12 is not fastened to the vehicle body 3 by the mounting structure 14. The elongated opening 16A of the mounting base 16 defines the adjustable range AR1. The elongated opening 16A extends along the longitudinal center axis 4A of the tubular part 4.

The mounting member 6C includes an additional elongated opening 6E. The adjustment member 18 is configured to be movably provided in the additional elongated opening 6E. The adjustment member 18 is provided in the elongated opening 16A and the additional elongated opening 6E in the mounting state where the base member 12 is coupled to the vehicle body 3 by the mounting structure 14. The adjustment member 18 is movable relative to the mounting member 6C of the additional operating device 6 within the additional elongated opening 6E in the state where the base member 12 is not fastened to the vehicle body 3 by the mounting structure 14. The additional elongated opening 6E of the mounting member 6C defines the additional adjustable range AR2. The additional elongated opening 6E extends along an outer peripheral surface of the tubular part 4 of the vehicle body 3 about the longitudinal center axis 4A.

As seen in FIG. 2, the adjustment member 18 includes an adjustment screw 20 and an adjustment member 22. The adjustment member 22 includes a through hole 22A having an adjustment threaded hole 22B. The adjustment screw 20 is threadedly engaged with the adjustment threaded hole 22B of the adjustment member 22. The adjustment member 22 includes a flange part 22C. The mounting member 6C of the additional operating device 6 is held between the mounting base 16 and the flange part 22C of the adjustment member 22. However, the structure of the adjustment member 18 is not limited to the illustrated structure.

Figure 3:
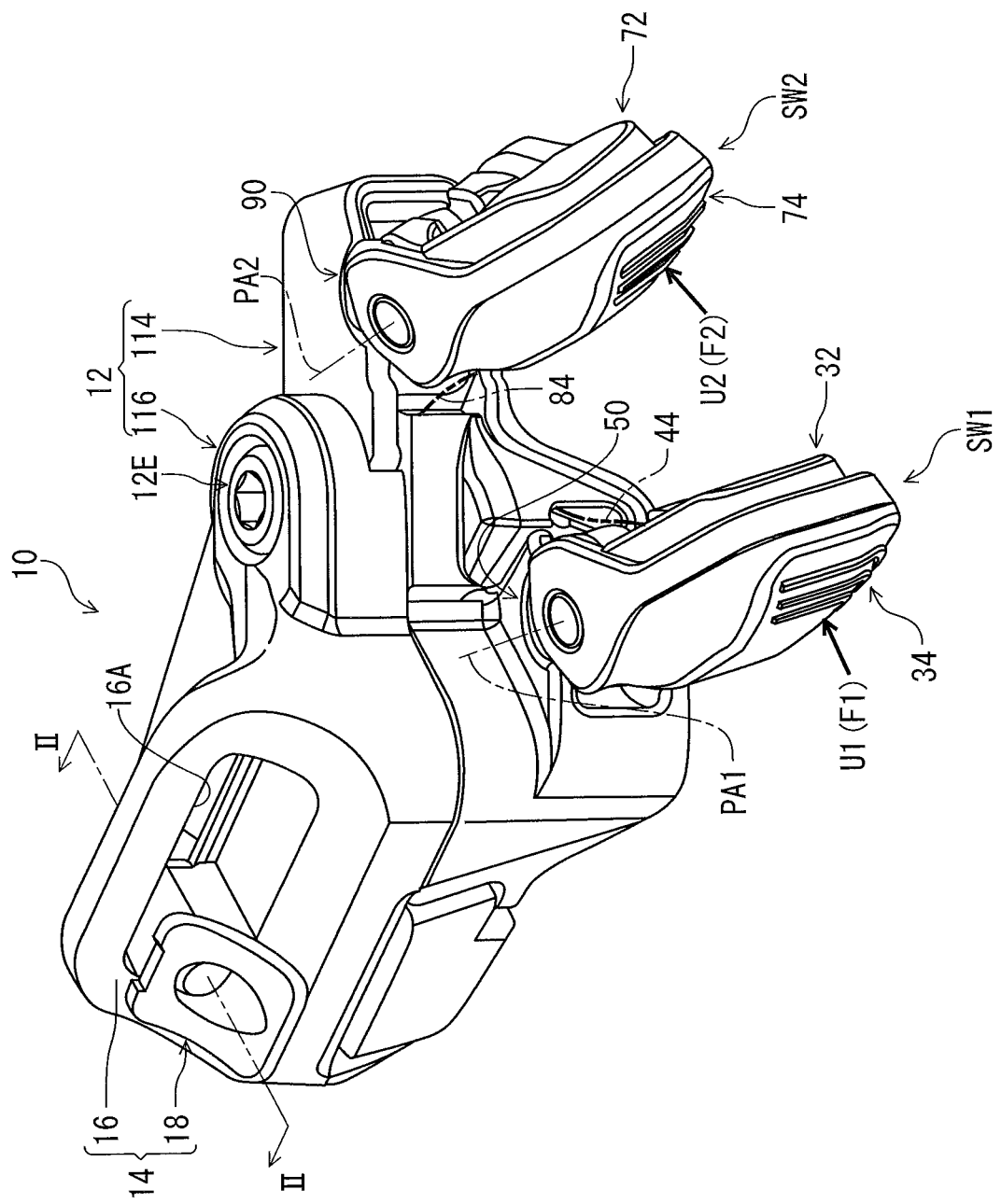
FIG. 3 is a perspective view of the operating device illustrated in FIG. 1.

As seen in FIG. 3, the operating device 10 for the human-powered vehicle 2 comprises a first switch unit SW1. The first switch unit SW1 is configured to be activated in response to a first user operation U1. The first user operation U1 includes a first operating force F1. Thus, the first switch unit SW1 is configured to be activated in response to the first operating force F1.

The first switch unit SW1 includes a first base 32 and a first operating member 34. The first operating member 34 is movably coupled to the first base 32. In the present embodiment, the first operating member 34 is pivotally coupled to the first base 32 about a first pivot axis PA1. However, the relative movement between the first base 32 and the first operating member 34 is not limited to a pivotal movement.

Figure 4:
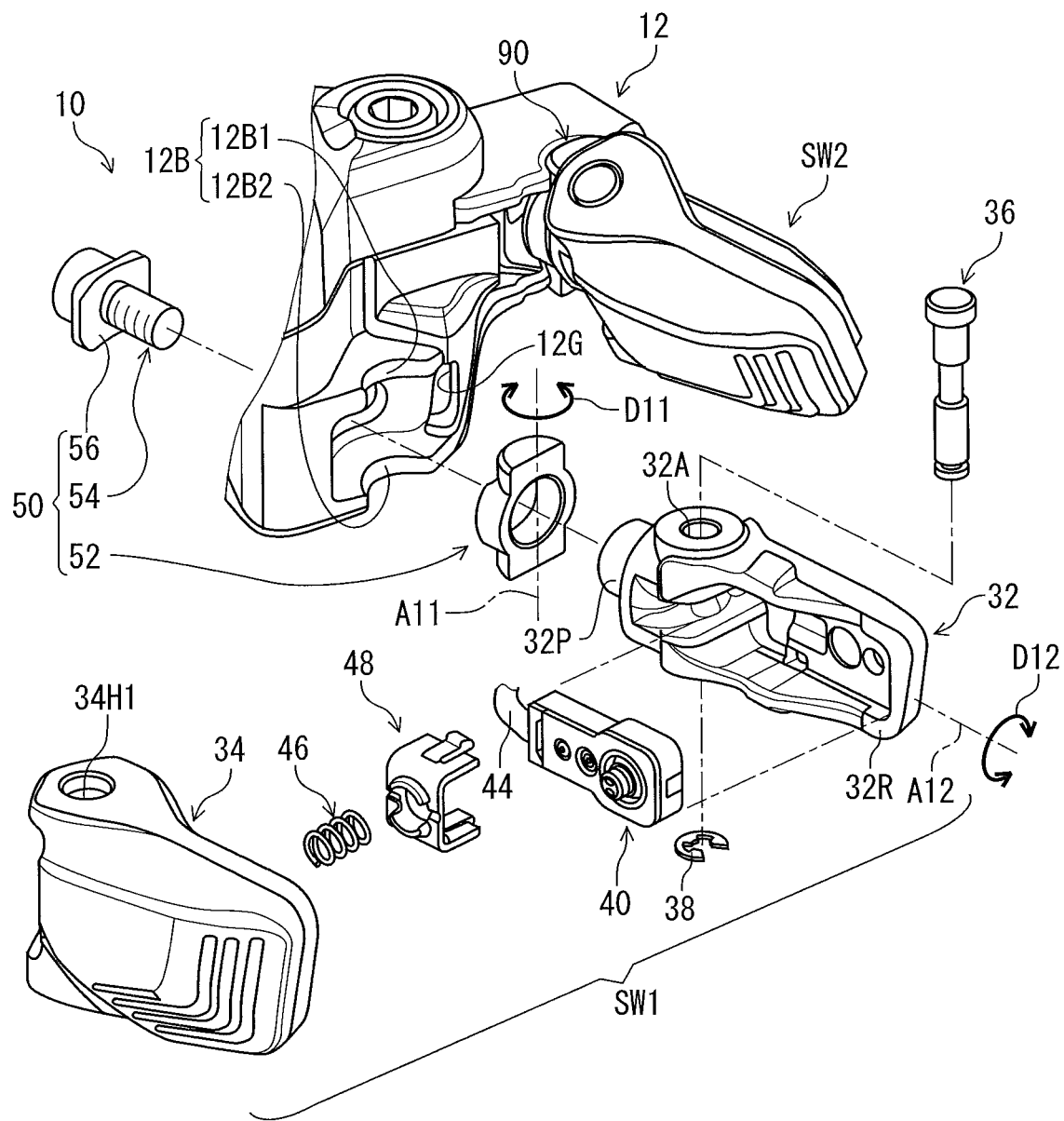
FIG. 4 is an exploded perspective view of the operating device illustrated in FIG. 3.

As seen in FIG. 4, the first switch unit SW1 includes a first pivot pin 36 and a first snap ring 38. The first pivot pin 36 pivotally couples the first base 32 and the first operating member 34 about the first pivot axis PA1. The first base 32 includes a first pivot hole 32A. The first pivot pin 36 extends through the first pivot hole 32A. The first snap ring 38 is attached to an end of the first pivot pin 36.

Figure 5:
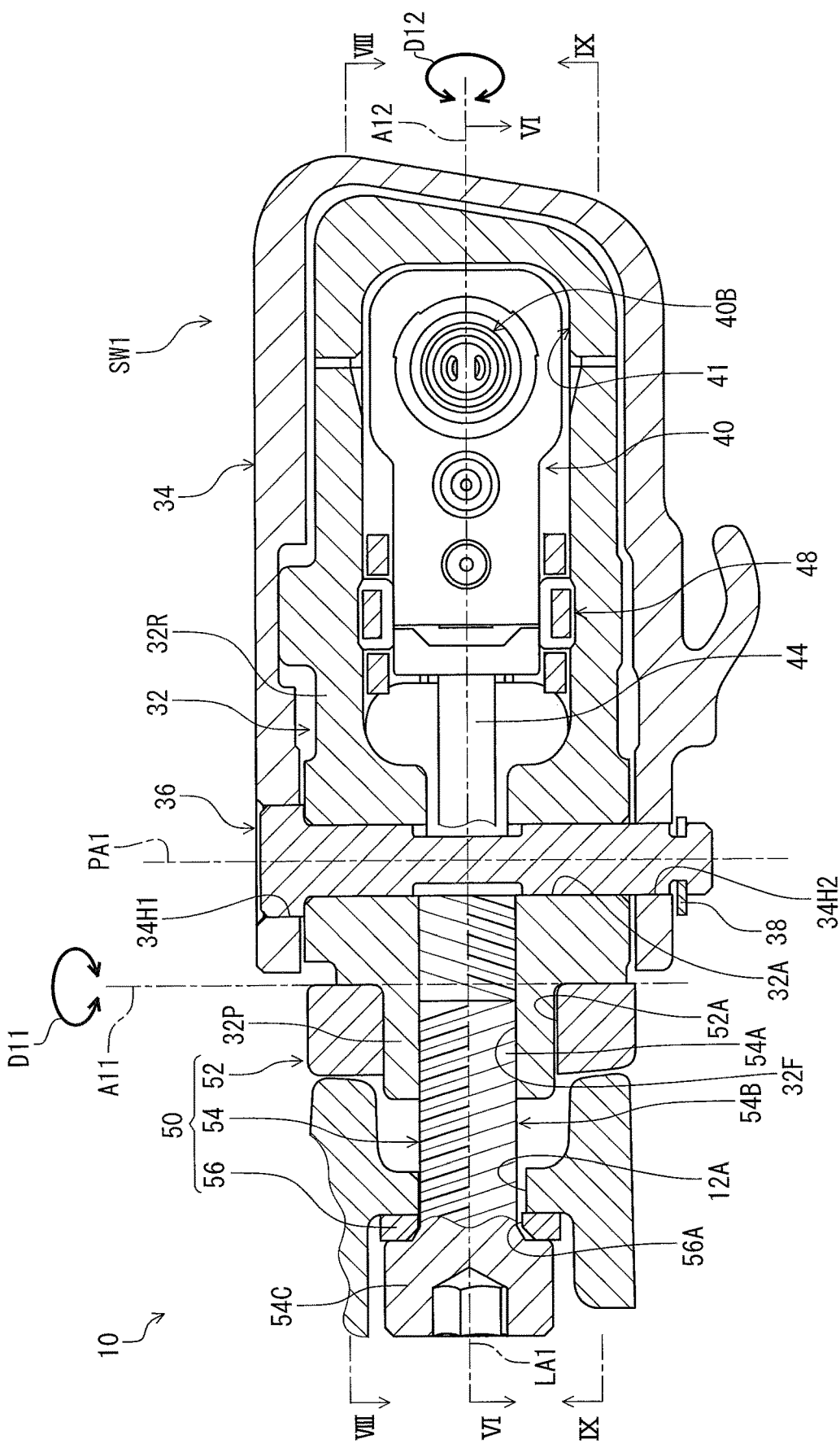
FIG. 5 is a cross-sectional view of the operating device taken along line V-V of FIG. 6.

As seen in FIG. 5, the first operating member 34 includes a first pivot hole 34H1 and a first additional pivot hole 34H2. The first pivot hole 34H1 is spaced apart from the first additional pivot hole 34H2 along the first pivot axis PA1. The first pivot pin 36 extends through the first pivot hole 34H1 and the first additional pivot hole 34H2.

The first operating member 34 is a separate member from the first base 32. In the present embodiment, the first base 32 is made of a first material. The first operating member 34 is made of a second material different from the first material. The first material includes a resin material. The second material includes an elastic material. Examples of the elastic material include elastomer such as rubber. However, the first material and the second material are not limited to the above materials.

Figure 6:
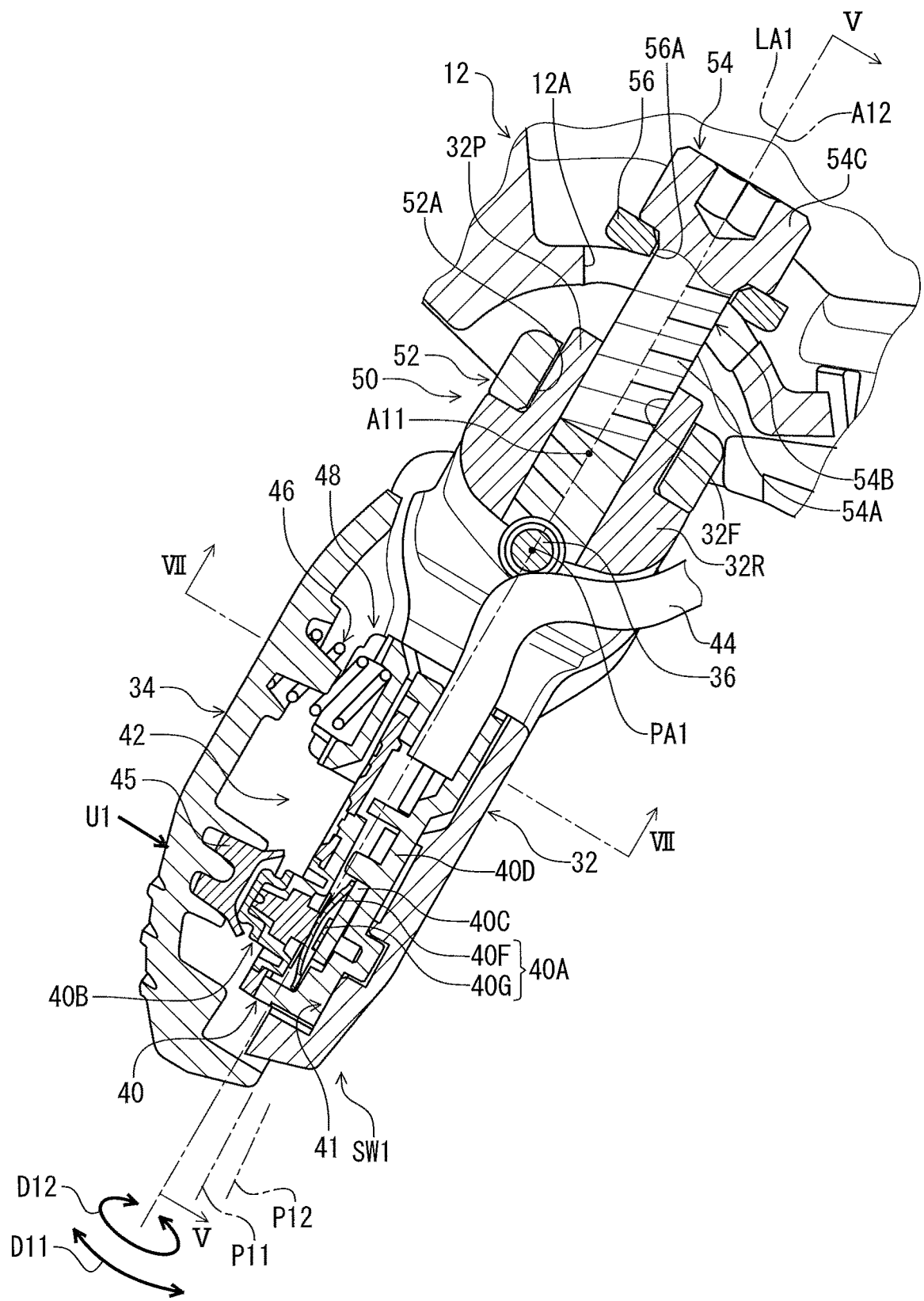
FIG. 6 is a cross-sectional view of the operating device taken along line VI-VI of FIG. 5.

As seen in FIG. 6, the first operating member 34 is movably coupled to the first base 32 from a first rest position P11 to a first operated position P12 in response to the first user operation U1. The first operating member 34 is pivotally coupled to the first base 32 about the first pivot axis PA1 from the first rest position P11 to the first operated position P12 in response to the first user operation U1.

In the present application, the term "rest position" as used herein refers to a position at which a movable part such as the first operating member 34 remains stationary in a state where the movable part is not operated by the user. The term "operated position" as used herein refers to a position at which the movable part has been operated by the user to perform the operation of the component such as the first switch unit SW1.

The first switch unit SW1 includes a first electrical switch 40. The first electrical switch 40 is configured to be activated in response to the first user operation U1. The first electrical switch 40 is mounted to the first base 32. The first base 32 includes an attachment recess 41. The first electrical switch 40 is at least partially provided in the attachment recess 41.

In the present embodiment, the first switch unit SW1 is configured to be detachably coupled to the base member 12. The first switch unit SW1 is configured to be detachably and reattachably coupled to the base member 12. However, the first switch unit SW1 can be coupled to the base member 12 not to be detachable from the base member 12.

The terms "detachable and reattachable" and "detachably and reattachably" as used herein, encompass a configuration in which an element is repeatedly detachable from and attachable to another element without substantial damage.

As seen in FIG. 6, the first electrical switch 40 is at least partially provided between the first base 32 and the first operating member 34 to be activated in response to a movement of the first operating member 34 relative to the first base 32. The first electrical switch 40 is at least partially provided between the first base 32 and the first operating member 34 to be activated in response to a pivotal movement of the first operating member 34 relative to the first base 32.

In the present embodiment, the first electrical switch 40 is entirely provided between the first base 32 and the first operating member 34 to be activated in response to the movement of the first operating member 34 relative to the first base 32. The first electrical switch 40 is entirely provided between the first base 32 and the first operating member 34 to be activated in response to the pivotal movement of the first operating member 34 relative to the first base 32. However, the first electrical switch 40 can be partially provided between the first base 32 and the first operating member 34 if needed and/or desired.

The first operating member 34 is configured to be attached to the first base 32 to define an internal space 42 between the first base 32 and the first operating member 34. The first electrical switch 40 is provided in the internal space 42. However, the first electrical switch 40 can be at least partially provided outside the internal space 42 if needed and/or desired.

The first electrical switch 40 includes a switch circuit 40A, a button 40B, a base 40C, and a casing 40D. The switch circuit 40A and the base 40C are provided in the casing 40D. The switch circuit 40A includes a movable contact 40F and a stationary contact 40G. The stationary contact 40G is provided on the base 40C. The movable contact 40F is elastically deformable and is provided on the base 40C. The movable contact 40F is contactable with the stationary contact 40G. The button 40B is movably attached to the base 40C. The button 40B is movable relative to the base 40C in response to the first user operation U1. The operating device 10 further comprises an electric cable 44. The movable contact 40F and the stationary contact 40G are electrically connected with the electric cable 44.

The movable contact 40F is not in contact with the stationary contact 40G in a state where the button 40B does not receive the first user operation U1. The movable contact 40F is elastically deformed to contact the stationary contact 40G when the button 40B transmits the first user operation U1 to the movable contact 40F. However, the structure of the first electrical switch 40 is not limited to the illustrated embodiment.

The first switch unit SW1 includes an intermediate part 45. The intermediate part 45 is provided between the first operating member 34 and the first electrical switch 40. The intermediate part 45 is a separate member from the first operating member 34. The intermediate part 45 is attached to the first operating member 34. The intermediate part 45 is provided between the first operating member 34 and the button 40B of the first electrical switch 40. The intermediate part 45 is contactable with the button 40B of the first electrical switch 40 in response to a movement of the first operating member 34 relative to the first base 32. The intermediate part 45 can be integrally provided with the first operating member 34 as a one-piece unitary member if needed and/or desired.

The first switch unit SW1 includes a first biasing member 46. The first biasing member 46 is at least partially provided between the first operating member 34 and the first electrical switch 40 to bias the first electrical switch 40 toward the first base 32. The first biasing member 46 is a separate member from the first base 32, the first operating member 34, and the first electrical switch 40. The first biasing member 46 is compressed between the first operating member 34 and the first electrical switch 40. In the present embodiment, the first biasing member 46 is entirely provided between the first operating member 34 and the first electrical switch 40 to bias the first electrical switch 40 toward the first base 32. The first biasing member 46 includes a coiled spring. However, the first biasing member 46 can be partially provided between the first operating member 34 and the first electrical switch 40 to bias the first electrical switch 40 toward the first base 32 if needed and/or desired. The first biasing member 46 can include a structure (e.g., an elastic material such as rubber) other than the coiled spring.

Figure 7:
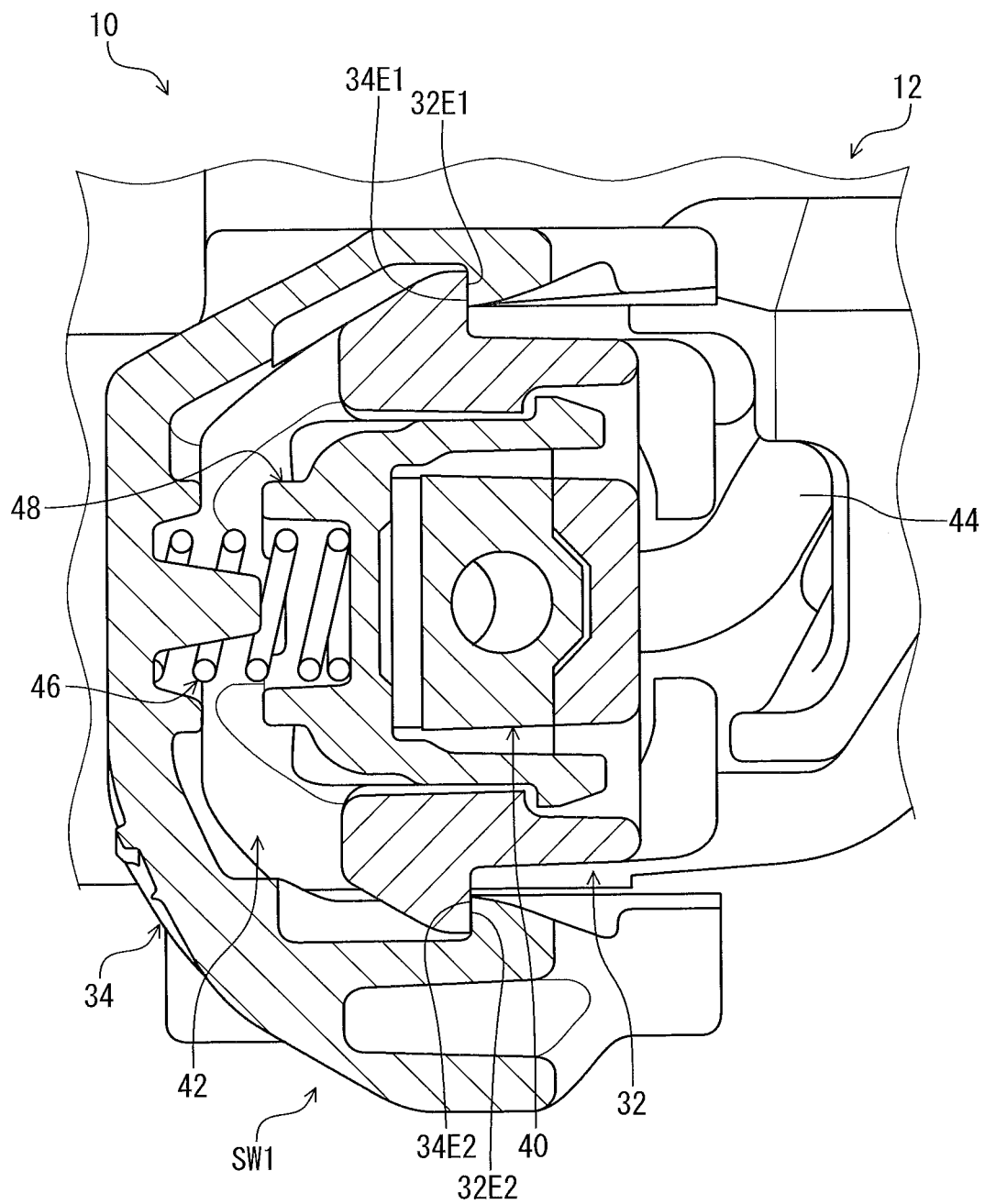
FIG. 7 is a cross-sectional view of the operating device taken along line VII-VII of FIG. 6.

As seen in FIG. 7, the first switch unit SW1 includes a first holder 48. The first holder 48 is attached to the first base 32 to hold the first electrical switch 40 relative to the first base 32. The first biasing member 46 is compressed between the first operating member 34 and the first holder 48. The first biasing member 46 is provided between the first operating member 34 and the first holder 48 to bias the first electrical switch 40 toward the first base 32. The first biasing member 46 is provided between the first operating member 34 and the first holder 48 to bias the first operating member 34 toward the first rest position P11. The first holder 48 can be omitted from the first switch unit SW1 if needed and/or desired.

The first base 32 includes first stopper surfaces 32E1 and 32E2. The first operating member 34 includes second stopper surfaces 34E1 and 34E1. The first stopper surface 32E1 is contactable with the second stopper surface 34E1. The first stopper surface 32E2 is contactable with the second stopper surface 34E2. The first stopper surface 32E1 is pressed against the second stopper surface 34E1 by the biasing force of the first biasing member 46. The first stopper surface 32E2 is pressed against the second stopper surface 34E2 by the biasing force of the first biasing member 46. Thus, the first stopper surfaces 32E1 and 32E2 and the second stopper surfaces 34E1 and 34E1 are configured to maintain the first operating member 34 relative to the first base 32 in the first rest position P11.

As seen in FIG. 6, the operating device 10 for the human-powered vehicle 2 comprises a first coupling structure 50. The first coupling structure 50 couples the base member 12 and the first base 32 such that the first base 32 is adjustable relative to the base member 12 in a first direction D11 and is adjustable relative to the first coupling structure 50 in a first additional direction D12 different from the first direction D11. The first additional direction D12 is non-parallel to the first direction D11.

In the present embodiment, the first coupling structure 50 couples the base member 12 and the first base 32 such that the first base 32 is adjustable relative to the base member 12 about a first axis A11 and is adjustable relative to the first coupling structure 50 about a first additional axis A12 different from the first axis A11. The first direction D11 is circumferentially defined about the first axis A11. The first additional direction D12 is circumferentially defined about the first additional axis A12. However, the first direction D11 can include a linear direction defined along the first axis A11 if needed and/or desired. The first additional direction D12 can include a linear direction defined along the first additional axis A12 if needed and/or desired.

The first coupling structure 50 includes a first intermediate member 52 and a first fastener 54. The first intermediate member 52 is at least partially provided between the base member 12 and the first base 32 to guide the first base 32 relative to the base member 12 in at least one of the first direction D11 and the first additional direction D12. The first fastener 54 is configured to fasten the first base 32 to the base member 12 to hold the first intermediate member 52 between the first base 32 and the base member 12.

The first coupling structure 50 has: a first fastening state where the first base 32 and the first intermediate member 52 are fastened to the base member 12 by the first fastener 54; and a first adjustable state where the first base 32 is coupled to the base member 12 by the first fastener 54 to be movable relative to the base member 12 in each of the first direction D11 and the first additional direction D12. For example, the first fastener 54 is tightened in the first fastening state. The first fastener 54 is loosened in the first fastening state. Thus, the first fastener 54 is configured to change a state of the first coupling structure 50 between the first fastening state and the first adjustable state.

Figure 8:
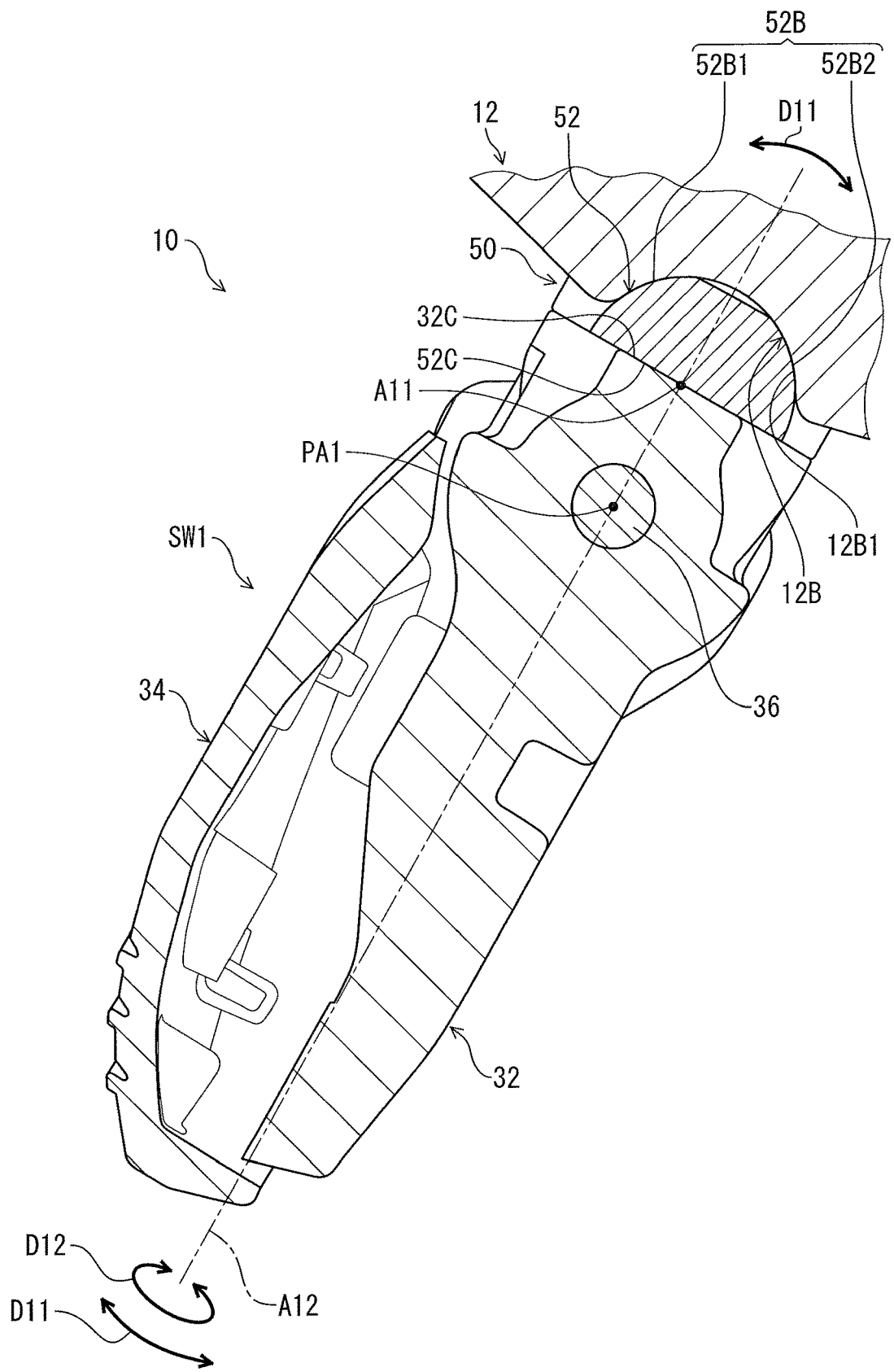
FIG. 8 is a cross-sectional view of the operating device taken along line VIII-VIII of FIG. 5.

As seen in FIG. 8, the first base 32 and the first intermediate member 52 are movable relative to the base member 12 in the first direction D11 in the first adjustable state. The first base 32 is movable relative to the first intermediate member 52 in the first additional direction D12 in the first adjustable state.

The first intermediate member 52 is at least partially provided between the base member 12 and the first base 32 to guide the first base 32 relative to the base member 12 about at least one of the first axis A11 and the first additional axis A12. In the present embodiment, the first intermediate member 52 is entirely provided between the base member 12 and the first base 32 to guide the first base 32 relative to the base member 12 about each of the first axis A11 and the first additional axis A12 However, the first intermediate member 52 can be partially provided between the base member 12 and the first base 32 to guide the first base 32 relative to the base member 12 about at least one of the first axis A11 and the first additional axis A12 if needed and/or desired.

As seen in FIG. 6, the first fastener 54 is at least partially provided in the first base 32. In the present embodiment, the first fastener 54 is partially provided in the first base 32. The first base 32 includes a first threaded hole 32F. The first fastener 54 includes a first externally threaded portion 54A engaged with the first threaded hole 32F. The first fastener 54 is partially provided in the first threaded hole 32F. However, the first fastener 54 can be entirely provided in the first base 32 if needed and/or desired.

The first fastener 54 extends along the first additional axis A12. The first fastener 54 has a first longitudinal center axis LA1 and extends along the first longitudinal center axis LA1. In the present embodiment, the first longitudinal center axis LA1 extends along the first additional axis A12. The first longitudinal center axis LA1 coincides with the first additional axis A12. However, the first longitudinal center axis LA1 can be offset from the first additional axis A12 if needed and/or desired.

The first fastener 54 includes a first rod 54B and a first head 54C. The first rod 54B extends along the first longitudinal center axis LA1. The first rod 54B includes the first externally threaded portion 54A. The first head 54C is provided at a longitudinal end of the first rod 54B. The first head 54C has an outer diameter larger than an outer diameter of the first rod 54B. In the present embodiment, the first fastener 54 is integrally provided as a one-piece unitary member. The first rod 54B is integrally provided with the first externally threaded portion 54A and the first head 54C. However, the first fastener 54 can include at least two separate parts if needed and/or desired.

The first coupling structure 50 includes a first washer 56. The first washer 56 includes a hole 56A. The first fastener 54 extends through the hole 56A of the first washer 56. The first washer 56 is held between the first head 54C of the first fastener 54 and the base member 12 in a state where the first base 32 is coupled to the base member 12 by the first fastener 54.

As seen in FIG. 6, the first fastener 54 is at least partially provided in the first intermediate member 52. The base member 12 includes a first opening 12A. The first fastener 54 extends through the first opening 12A. In the present embodiment, the first fastener 54 is partially provided in the first intermediate member 52. The first intermediate member 52 includes a first hole 52A. The first fastener 54 extends through the first hole 52A. However, the first fastener 54 can be entirely provided in the first intermediate member 52 if needed and/or desired.

As seen in FIG. 5, the first base 32 includes a first receiving portion 32R and a first protruding portion 32P. The first electrical switch 40 is attached to the first receiving portion 32R. The first protruding portion 32P protrudes from the first receiving portion 32R. The first protruding portion 32P is at least partially provided in the first hole 52A. The first threaded hole 32F is at least partially provided in the first protruding portion 32P.

In the present embodiment, the first protruding portion 32P is partially provided in the first hole 52A. The first protruding portion 32P is rotatable relative to the first intermediate member 52 about the first additional axis A12. The first protruding portion 32P is slidably contactable with an inner peripheral surface of the first hole 52A. The first threaded hole 32F is partially provided in the first protruding portion 32P. For example, the first protruding portion 32P has a tubular shape. However, the first protruding portion 32P can be entirely provided in the first hole 52A if needed and/or desired. The first threaded hole 32F can be entirely provided in the first protruding portion 32P if needed and/or desired. The first protruding portion 32P can have shapes other than the tubular shape if needed and/or desired.

As seen in FIG. 5, the first axis A11 intersects with the first additional axis A12. The first pivot axis PA1 intersects with the first additional axis A12. The first pivot axis PA1 is offset from the first axis A11. In the present embodiment, the first axis A11 is perpendicular to the first additional axis A12. The first pivot axis PA1 is perpendicular to the first additional axis A12. The first pivot axis PA1 is parallel to the first axis A11. However, the first axis A11 can be non-perpendicular to the first additional axis A12 if needed and/or desired. The first pivot axis PA1 can be non-perpendicular to the first additional axis A12 if needed and/or desired. The first pivot axis PA1 can be non-parallel to the first axis A11 if needed and/or desired.

Figure 9:
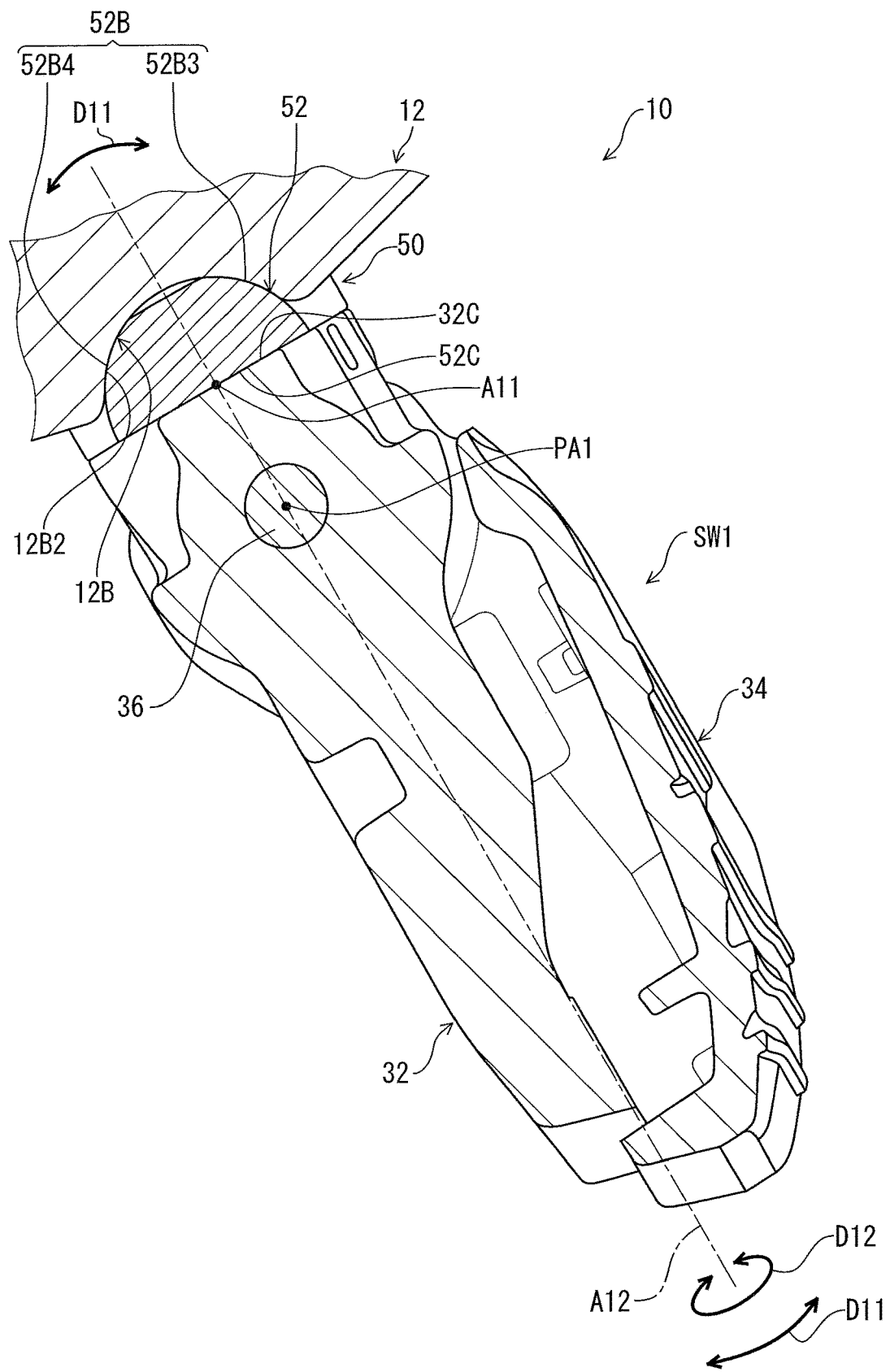
FIG. 9 is a cross-sectional view of the operating device taken along line IX-IX of FIG. 5.

As seen in FIGS. 8 and 9, the first intermediate member 52 is contactable with the base member 12 and the first base 32. The first intermediate member 52 includes a first contact surface 52B. The first contact surface 52B is contactable with the base member 12 to guide the first base 32 and the first intermediate member 52 relative to the base member 12 in the first direction D11. The base member 12 includes a first guide surface 12B. The first contact surface 52B is contactable with the first guide surface 12B to guide the first base 32 and the first intermediate member 52 relative to the base member 12 in the first direction D11.

In the present embodiment, the first contact surface 52B has a curved shape extending in the first direction D11. The first contact surface 52B extends in the first direction D11 about the first axis A11. The first guide surface 12B has a curved shape extending in the first direction D11. The first guide surface 12B extends in the first direction D11 about the first axis A11. A curvature radius of the first contact surface 52B is equal to a curvature radius of the first guide surface 12B. In the present embodiment, the first contact surface 52B has a curved convex shape. The first guide surface 12B has a curved concave shape. However, the first contact surface 52B can have a curved concave shape if needed and/or desired. The first guide surface 12B has a curved convex shape if needed and/or desired.

In the present embodiment, the first contact surface 52B includes first contact surfaces 52B1, 52B2, 52B3, and 52B4. The first guide surface 12B includes first guide surfaces 12B1 and 12B2.

As seen in FIG. 8, the first contact surfaces 52B1 and 52B2 are contactable with the first guide surface 12B1. The first contact surface 52B1 has a curved shape extending in the first direction D11. The first contact surface 52B1 extends in the first direction D11 about the first axis A11. The first contact surface 52B2 has a curved shape extending in the first direction D11. The first contact surface 52B2 extends in the first direction D11 about the first axis A11. The first guide surface 12B1 has a curved shape extending in the first direction D11. The first guide surface 12B1 extends in the first direction D11 about the first axis A11.

In the present embodiment, the first contact surface 52B1 is spaced apart from the first contact surface 52B2. The first guide surface 12B1 is integrally provided as a single continuous surface. However, the first contact surface 52B1 can be integrally provided with the first contact surface 52B2 as a single continuous surface if needed and/or desired. The first guide surface 12B1 can include separate surfaces if needed and/or desired.

As seen in FIG. 9, the first contact surfaces 52B3 and 52B4 are contactable with the first guide surface 12B2. The first contact surface 52B3 has a curved shape extending in the first direction D11. The first contact surface 52B3 extends in the first direction D11 about the first axis A11. The first contact surface 52B4 has a curved shape extending in the first direction D11. The first contact surface 52B4 extends in the first direction D11 about the first axis A11. The first guide surface 12B2 has a curved shape extending in the first direction D11. The first guide surface 12B2 extends in the first direction D11 about the first axis A11.

In the present embodiment, the first contact surface 52B3 is spaced apart from the first contact surface 52B4. The first guide surface 12B2 is integrally provided as a single continuous surface. However, the first contact surface 52B3 can be integrally provided with the first contact surface 52B4 as a single continuous surface if needed and/or desired. The first guide surface 12B2 can include separate surfaces if needed and/or desired.

Figure 10:
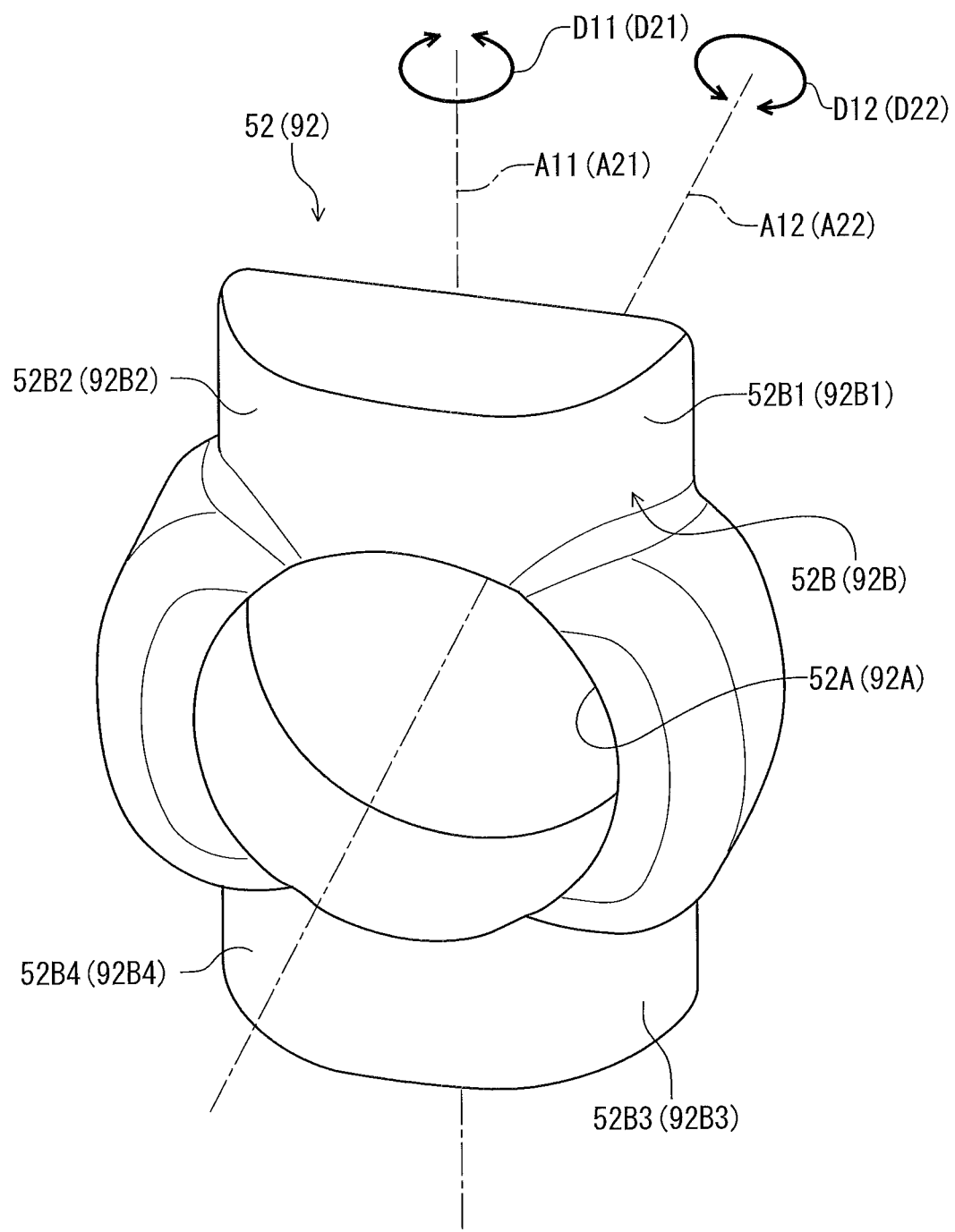
FIG. 10 is a perspective view of a first or second intermediate member of a first or second coupling structure of the operating device illustrated in FIG. 3.

As seen in FIG. 10, the first contact surface 52B1 is spaced apart from the first contact surfaces 52B2, 52B3, and 52B4. The first contact surface 52B2 is spaced apart from the first contact surfaces 52B1, 52B3, and 52B4. The first contact surface 52B3 is spaced apart from the first contact surfaces 52B1, 52B2, and 52B4. The first contact surface 52B4 is spaced apart from the first contact surfaces 52B1, 52B2, and 52B3. The first hole 52A is provided between the first contact surfaces 52B1 and 52B3. The first hole 52A is provided between the first contact surfaces 52B2 and 52B4. However, the arrangement of the first contact surfaces 52B1, 52B2, 52B3, and 52B4 is not limited to the illustrated embodiment. As seen in FIGS. 8 and 9, the first intermediate member 52 includes a first additional contact surface 52C. The first additional contact surface 52C is contactable with the first base 32 to guide the first base 32 relative to the first intermediate member 52 in the first additional direction D12. The first base 32 includes a first additional guide surface 32C. The first additional contact surface 52C is contactable with the first additional guide surface 32C to guide the first base 32 relative to the first intermediate member 52 in the first additional direction D12.

Figure 11:
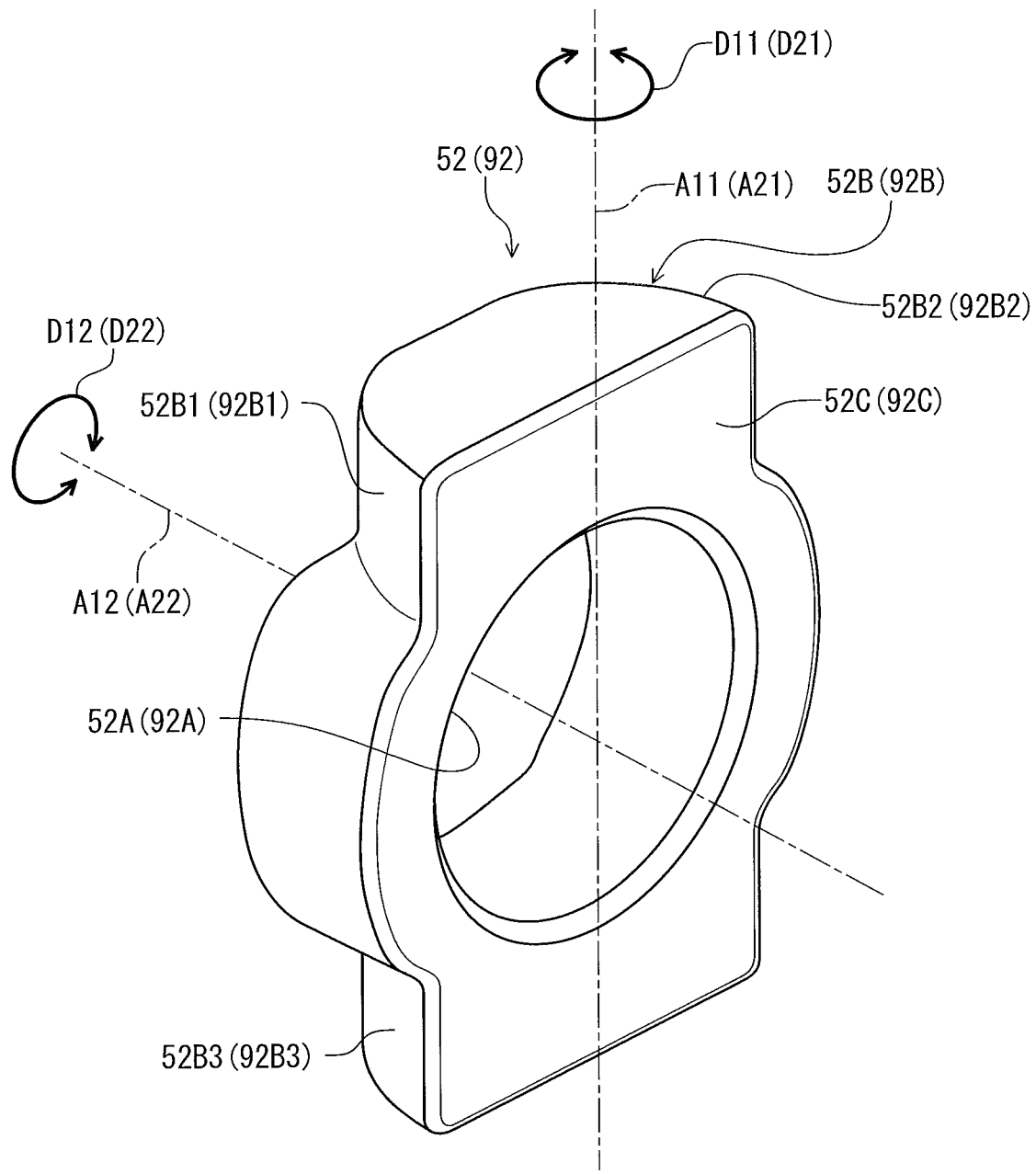
FIG. 11 is a perspective view of a first or second intermediate member of a first or second coupling structure of the operating device illustrated in FIG. 3.

As seen in FIG. 11, the first additional contact surface 52C has a flat shape extending in the first additional direction D12. The first additional contact surface 52C has an annular shape extending in the first additional direction D12. As seen in FIGS. 8 and 9, the first additional contact surface 52C is perpendicular to the first additional axis A12. The first additional guide surface 32C has a flat shape. The first additional guide surface 32C is perpendicular to the first additional axis A12. However, the first additional contact surface 52C can have shapes other than the flat shape and/or the annular shape if needed and/or desired. The first additional guide surface 32C can have shapes other than the flat shape and/or the annular shape if needed and/or desired.

Figure 12:
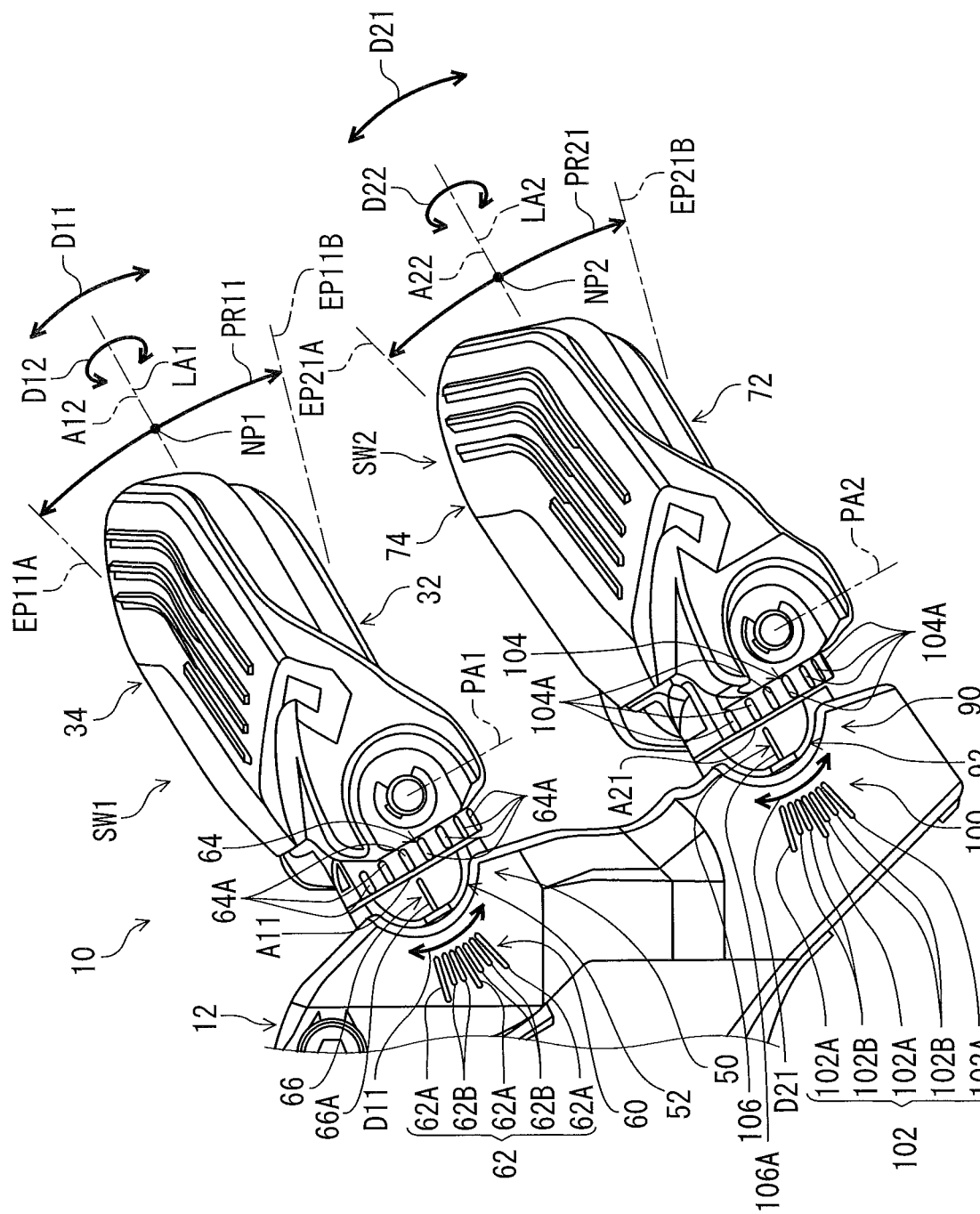
FIG. 12 is a bottom view of the operating device illustrated in FIG. 3.

As seen in FIG. 12, the operating device 10 further comprises a first indicator 60. The first indicator 60 is provided to at least one of the base member 12, the first switch unit SW1, and the first coupling structure 50 to indicate a relative position between at least two of the base member 12, the first switch unit SW1, and the first coupling structure 50.

In the present embodiment, the first indicator 60 is provided to the base member 12 and the first coupling structure 50 to indicate a relative position between the base member 12 and the first coupling structure 50. The first indicator 60 is provided to the first switch unit SW1 and the first coupling structure 50 to indicate a relative position between the first switch unit SW1 and the first coupling structure 50.

Specifically, the first indicator 60 is provided to the base member 12 and the first intermediate member 52 to indicate a relative position between the base member 12 and the first intermediate member 52. The first indicator 60 is provided to the first base 32 and the first intermediate member 52 to indicate a relative position between the first base 32 and the first intermediate member 52. However, the first indicator 60 can be provided to portions of the first coupling structure 50 other than the first intermediate member 52 if needed and/or desired. The first indicator 60 can be provided to portions of the first switch unit SW1 other than the first base 32 if needed and/or desired. The first indicator 60 can be at least partially omitted from the operating device 10 if needed and/or desired.

In the present embodiment, the first indicator 60 includes a first mark 62, a second mark 64, and a third mark 66. The first mark 62 is provided to the base member 12. The second mark 64 is provided to the first switch unit SW1. The third mark 66 is provided to the first coupling structure 50.

The first mark 62 and the third mark 66 are respectively provided to the base member 12 and the first coupling structure 50 to indicate the relative position between the base member 12 and the first coupling structure 50. The second mark 64 and the third mark 66 are respectively provided to the first switch unit SW1 and the first coupling structure 50 to indicate the relative position between the first switch unit SW1 and the first coupling structure 50.

The first mark 62 and the third mark 66 are respectively provided to the base member 12 and the first intermediate member 52 to indicate the relative position between the base member 12 and the first intermediate member 52. The second mark 64 and the third mark 66 are respectively provided to the first base 32 and the first intermediate member 52 to indicate the relative position between the first base 32 and the first intermediate member 52.

The first mark 62 includes at least one first linear portion 62A and/or 62B provided to the base member 12. The first linear portion 62A linearly extends and has an elongated shape. The first linear portion 62B linearly extends and has an elongated shape. In the present embodiment, the first mark 62 includes at least one first linear portion 62A and at least one first linear portion 62B. A total number of the first linear portions 62A and 62B is seven. A total number of the first linear portion 62A is three. A total number of the first linear portion 62B is four. The first linear portions 62A and 62B are arranged about the first axis A11 in the first direction D11 at regular intervals. The first linear portion 62A has a length different from a length of the first linear portion 62B. The length of the first linear portion 62A is longer than the length of the first linear portion 62B. However, the length of the first linear portion 62A can be shorter than or equal to the length of the first linear portion 62B if needed and/or desired. The total number of the first linear portions 62A and 64B is not limited to seven. The total number of the first linear portions 62A is not limited to three. The total number of the first linear portions 62B is not limited to four. The first mark 62 can include at least one first linear portion 62A and/or 62B if needed and/or desired. The first mark 62 can include any letters, symbols, and signs configured to indicate the relative position between the base member 12 and the first coupling structure 50 if needed and/or desired.

The second mark 64 includes at least one second linear portion 64A provided to the first switch unit SW1. The second linear portion 64A linearly extends and has an elongated shape. In the present embodiment, the at least one second linear portion 64A is provided to the first base 32. The second mark 64 includes at least two second linear portion 64A. A total number of the second linear portions 64A is seven. The second linear portions 64A are arranged about the first additional axis A12 in the first additional direction D12 at regular intervals. A length of one of the second linear portions 64A is equal to a length of another of the second linear portions 64A. However, the length of at least one of the second linear portions 64A can be different from the length of another of the second linear portions 64A if needed and/or desired. The total number of the second linear portions 64A is not limited to seven. The second mark 64 can include at least one second linear portion 64A if needed and/or desired. The second mark 64 can include any letters, symbols, and signs configured to indicate the relative position between the first switch unit SW1 and the first coupling structure 50 if needed and/or desired.

The third mark 66 includes at least one third linear portion 66A provided to the first coupling structure 50. The third linear portion 66A linearly extends and has an elongated shape. In the present embodiment, the at least one third linear portion 66A is provided to the first intermediate member 52. A total number of the third linear portion 66A is one. The third linear portion 66A extends radially outwardly relative to the first axis A11 as viewed along the first axis A11. The third linear portion 66A extends along the first additional axis A12 as viewed along the first axis A11. However, the total number of the third linear portion 66A is not limited to one. The third mark 66 can include at least one third linear portion 66A if needed and/or desired. The third mark 66 can include any letters, symbols, and signs configured to indicate the relative position between the base member 12 and the first coupling structure 50 and/or between the first switch unit SW1 and the first coupling structure 50 if needed and/or desired.

As seen in FIG. 3, the operating device 10 further comprises a second switch unit SW2. The second switch unit SW2 is configured to be activated in response to a second user operation U2. The second user operation U2 includes a second operating force F2. Thus, the second switch unit SW2 is configured to be activated in response to the second operating force F2. The second switch unit SW2 has substantially the same structure as the structure of the first switch unit SW1.

The second switch unit SW2 includes a second base 72 and a second operating member 74. The second operating member 74 is movably coupled to the second base 72. In the present embodiment, the second operating member 74 is pivotally coupled to the second base 72 about a second pivot axis PA2. However, the relative movement between the second base 72 and the second operating member 74 is not limited to a pivotal movement.

Figure 13:
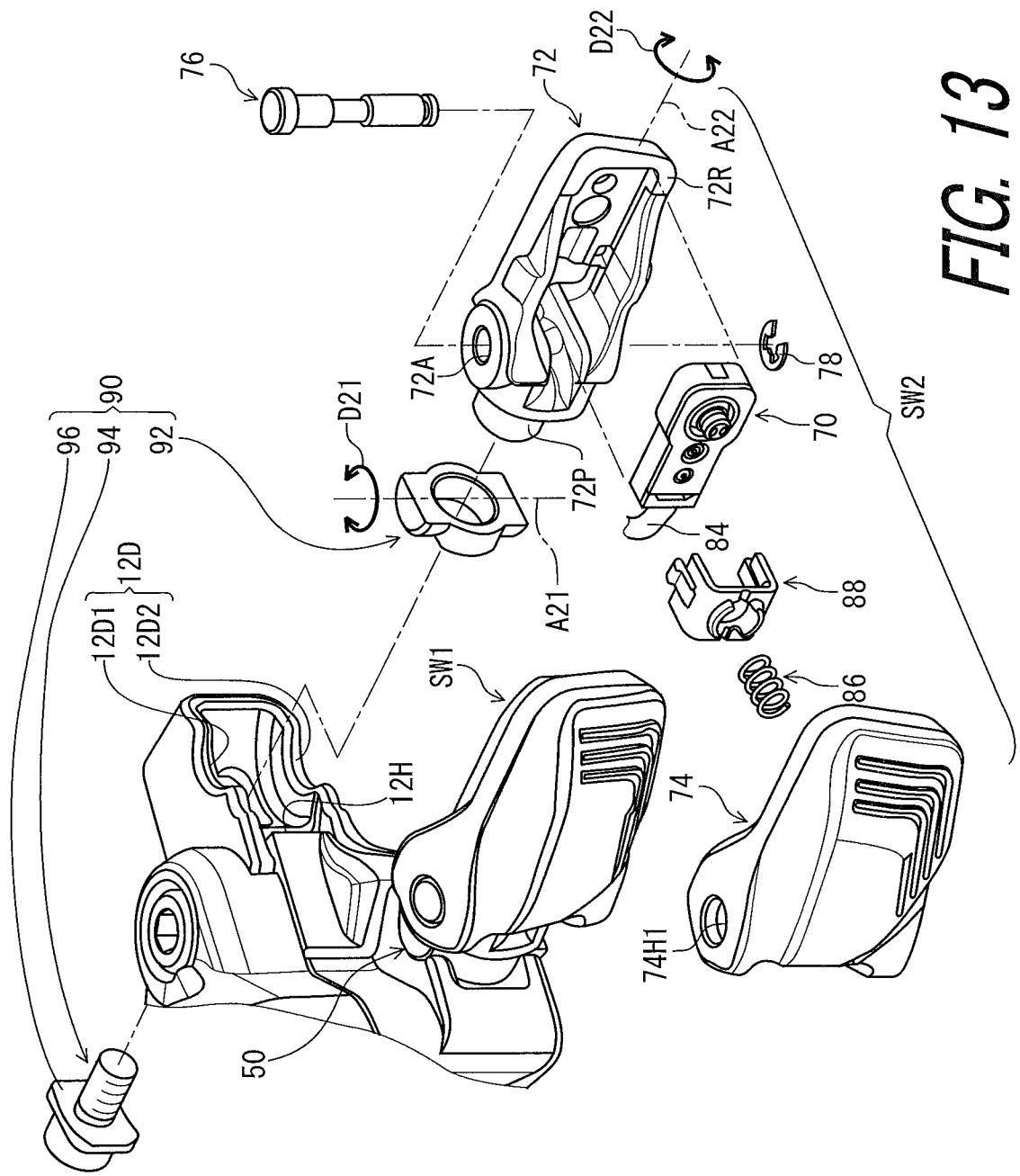
FIG. 13 is an exploded perspective view of the operating device illustrated in FIG. 3.

As seen in FIG. 13, the second switch unit SW2 includes a second pivot pin 76 and a second snap ring 78. The second pivot pin 76 pivotally couples the second base 72 and the second operating member 74 about the second pivot axis PA2. The second base 72 includes a second pivot hole 72A. The second pivot pin 76 extends through the second pivot hole 72A. The second snap ring 78 is attached to an end of the second pivot pin 76.

Figure 14:
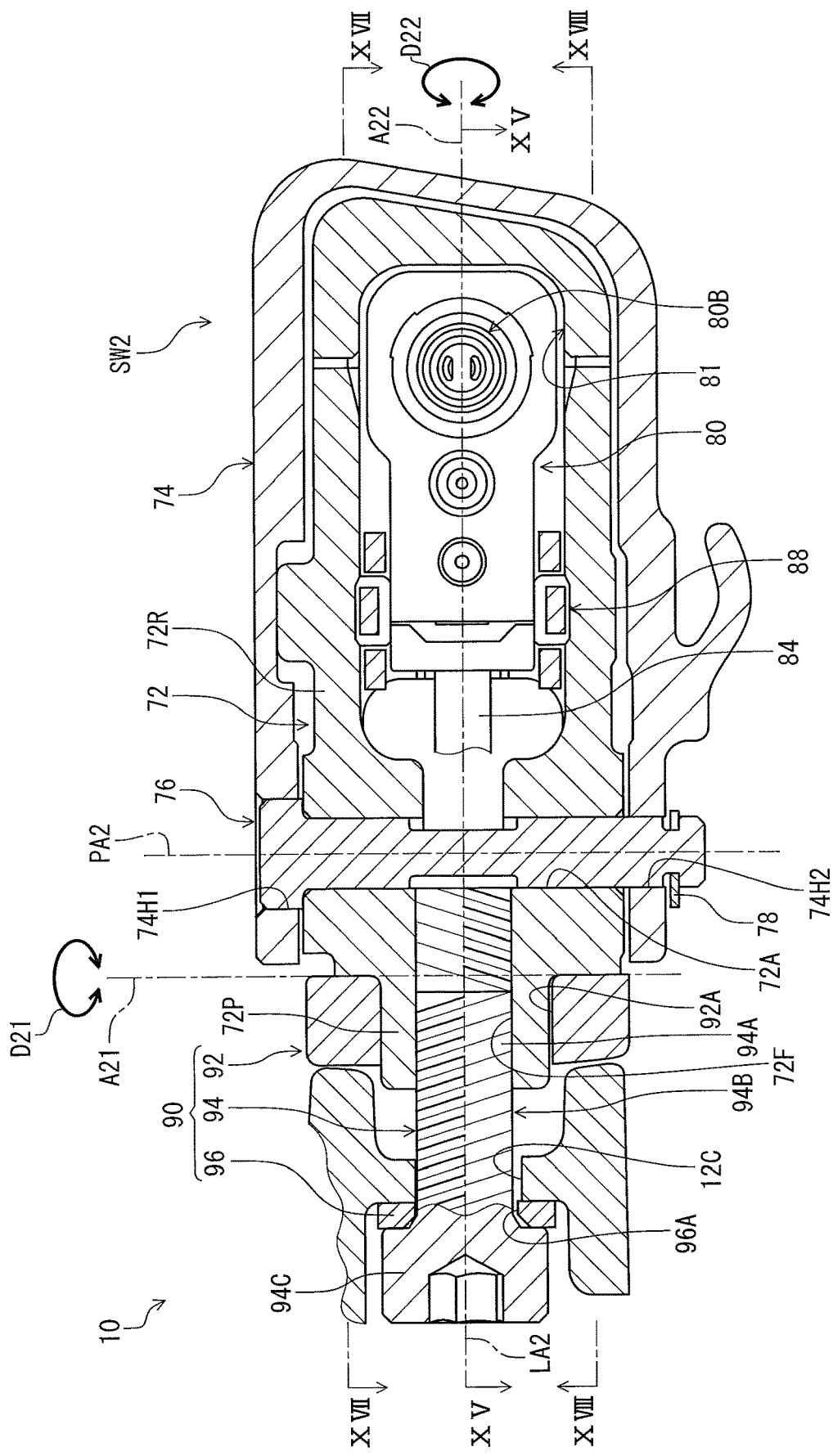
FIG. 14 is a cross-sectional view of the operating device taken along line XIV-XIV of FIG. 15.

As seen in FIG. 14, the second operating member 74 includes a second pivot hole 74H1 and a second additional pivot hole 74H2. The second pivot hole 74H1 is spaced apart from the second additional pivot hole 74H2 along the second pivot axis PA2. The second pivot pin 76 extends through the second pivot hole 74H1 and the second additional pivot hole 74H2.

The second operating member 74 is a separate member from the second base 72. In the present embodiment, the second base 72 is made of a second material. The second operating member 74 is made of a second material different from the second material. The second material includes a resin material. The second material includes an elastic material. Examples of the elastic material include elastomer such as rubber. However, the second material and the second material are not limited to the above materials.

Figure 15:
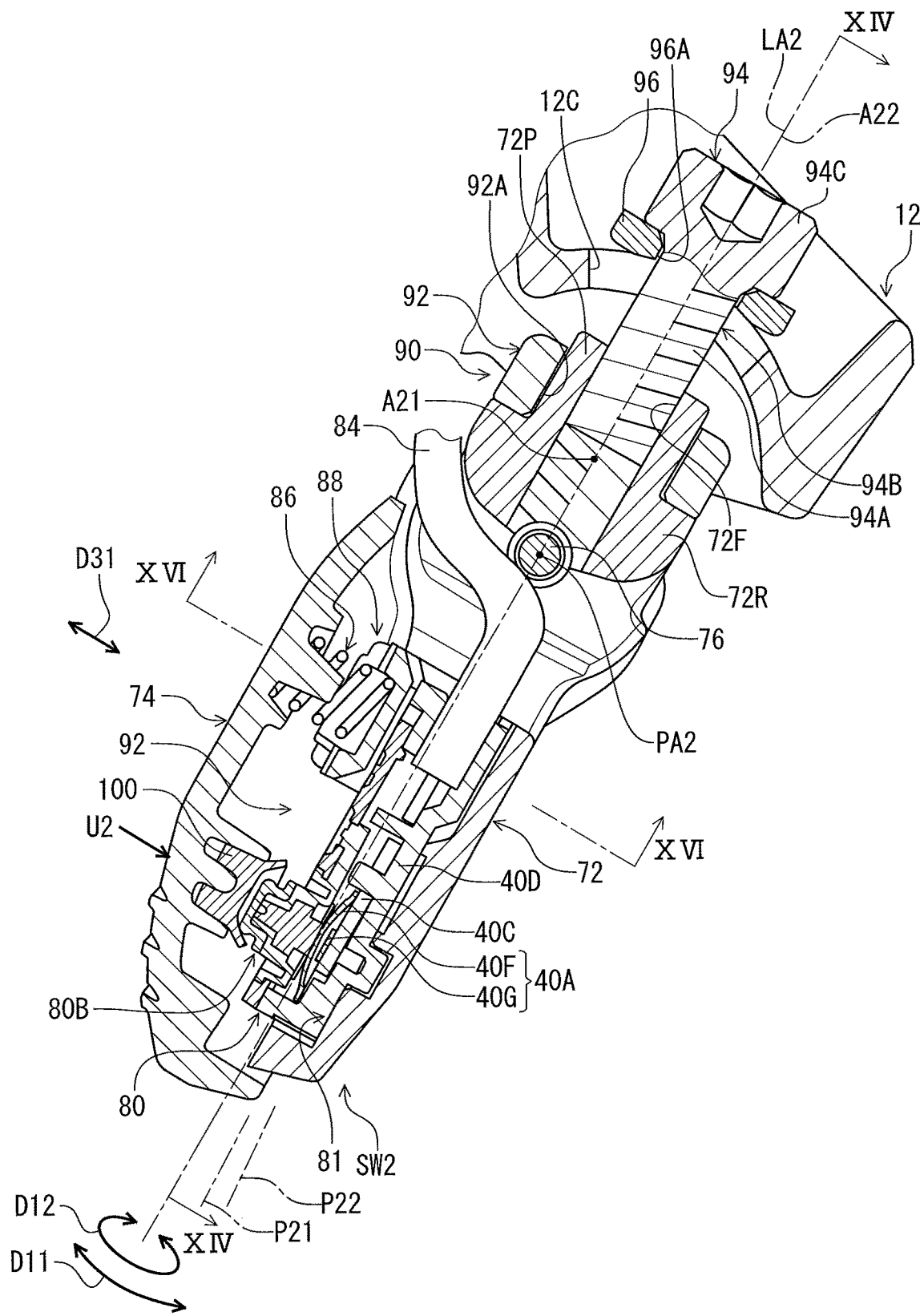
FIG. 15 is a cross-sectional view of the operating device taken along line XV-XV of FIG. 14.

As seen in FIG. 15, the second operating member 74 is movably coupled to the second base 72 from a second rest position P21 to a second operated position P22 in response to the second user operation U2. The second operating member 74 is pivotally coupled to the second base 72 about the second pivot axis PA2 from the second rest position P21 to the second operated position P22 in response to the second user operation U2.

The second switch unit SW2 includes a second electrical switch 80. The second electrical switch 80 is configured to be activated in response to the second user operation U2. The second electrical switch 80 is mounted to the second base 72. The second base 72 includes an attachment recess 81. The second electrical switch 80 is at least partially provided in the attachment recess 81.

In the present embodiment, the second switch unit SW2 is configured to be detachably coupled to the base member 12. The second switch unit SW2 is configured to be detachably and reattachably coupled to the base member 12. However, the second switch unit SW2 can be coupled to the base member 12 not to be detachable from the base member 12.

As seen in FIG. 15, the second electrical switch 80 is at least partially provided between the second base 72 and the second operating member 74 to be activated in response to a movement of the second operating member 74 relative to the second base 72. The second electrical switch 80 is at least partially provided between the second base 72 and the second operating member 74 to be activated in response to a pivotal movement of the second operating member 74 relative to the second base 72.

In the present embodiment, the second electrical switch 80 is entirely provided between the second base 72 and the second operating member 74 to be activated in response to the movement of the second operating member 74 relative to the second base 72. The second electrical switch 80 is entirely provided between the second base 72 and the second operating member 74 to be activated in response to the pivotal movement of the second operating member 74 relative to the second base 72. However, the second electrical switch can be partially provided between the second base 72 and the second operating member 74 if needed and/or desired.

The second operating member 74 is configured to be attached to the second base 72 to define an internal space 82 between the second base 72 and the second operating member 74. The second electrical switch 80 is provided in the internal space 82. However, the second electrical switch 80 can be at least partially provided outside the internal space 82 if needed and/or desired.

The second electrical switch 80 includes a switch circuit 80A, a button 80B, a base 80C, and a casing 80D. The switch circuit 80A and the base 80C are provided in the casing 80D. The switch circuit 80A includes a movable contact 80F and a stationary contact 80G. The stationary contact 80G is provided on the base 80C. The movable contact 80F is elastically deformable and is provided on the base 80C. The movable contact 80F is contactable with the stationary contact 80G. The button 80B is movably attached to the base 80C. The button 80B is movable relative to the base 80C in response to the second user operation U2. The operating device 10 further comprises an electric cable 84. The movable contact 80F and the stationary contact 80G are electrically connected with the electric cable 84.

The movable contact 80F is not in contact with the stationary contact 80G in a state where the button 80B does not receive the second user operation U2. The movable contact 80F is elastically deformed to contact the stationary contact 80G when the button 80B transmits the second user operation U2 to the movable contact 80F. However, the structure of the second electrical switch 80 is not limited to the illustrated embodiment.

The second switch unit SW2 includes an intermediate part 85. The intermediate part 85 is provided between the second operating member 74 and the second electrical switch 80. The intermediate part 85 is a separate member from the second operating member 74. The intermediate part 85 is attached to the second operating member 74. The intermediate part 85 is provided between the second operating member 74 and the button 80B of the second electrical switch 80. The intermediate part 85 is contactable with the button 80B of the second electrical switch 80 in response to a movement of the second operating member 74 relative to the second base 72. The intermediate part 85 can be integrally provided with the second operating member 74 as a one-piece unitary member if needed and/or desired.

The second switch unit SW2 includes a second biasing member 86. The second biasing member 86 is at least partially provided between the second operating member 74 and the second electrical switch 80 to bias the second electrical switch 80 toward the second base 72. The second biasing member 86 is a separate member from the second base 72, the second operating member 74, and the second electrical switch 80. The second biasing member 86 is compressed between the second operating member 74 and the second electrical switch 80. In the present embodiment, the second biasing member 86 is entirely provided between the second operating member 74 and the second electrical switch 80 to bias the second electrical switch 80 toward the second base 72. The second biasing member 86 includes a coiled spring. However, the second biasing member 86 can be partially provided between the second operating member 74 and the second electrical switch 80 to bias the second electrical switch 80 toward the second base 72 if needed and/or desired. The second biasing member 86 can include a structure (e.g., an elastic material such as rubber) other than the coiled spring.

Figure 16:
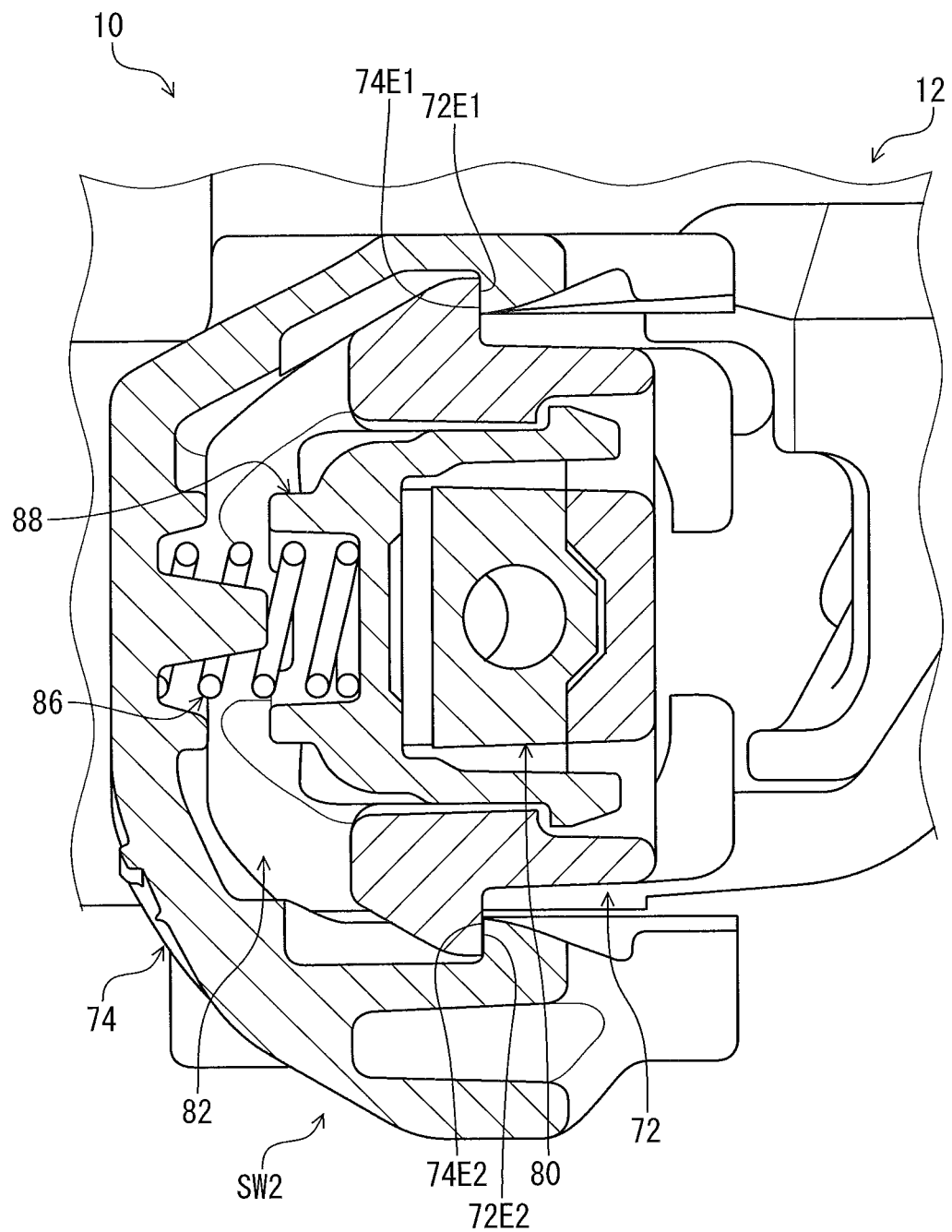
FIG. 16 is a cross-sectional view of the operating device taken along line XVI-XVI of FIG. 15.

As seen in FIG. 16, the second switch unit SW2 includes a second holder 88. The second holder 88 is attached to the second base 72 to hold the second electrical switch 80 relative to the second base 72. The second biasing member 86 is compressed between the second operating member 74 and the second holder 88. The second biasing member 86 is provided between the second operating member 74 and the second holder 88 to bias the second electrical switch 80 toward the second base 72. The second biasing member 86 is provided between the second operating member 74 and the second holder 88 to bias the second operating member 74 toward the second rest position P21. The second holder 88 can be omitted from the second switch unit SW2 if needed and/or desired.

The second base 72 includes second stopper surfaces 72E1 and 72E2. The second operating member 74 includes second stopper surfaces 74E1 and 74E1. The second stopper surface 72E1 is contactable with the second stopper surface 74E1. The second stopper surface 72E2 is contactable with the second stopper surface 74E2. The second stopper surface 72E1 is pressed against the second stopper surface 74E1 by the biasing force of the second biasing member 86. The second stopper surface 72E2 is pressed against the second stopper surface 74E2 by the biasing force of the second biasing member 86. Thus, the second stopper surfaces 72E1 and 72E2 and the second stopper surfaces 74E1 and 74E1 are configured to maintain the second operating member 74 relative to the second base 72 in the second rest position P21.

As seen in FIG. 15, the operating device 10 further comprises a second coupling structure 90. The second coupling structure 90 couples the base member 12 and the second base 72 such that the second base 72 is adjustable relative to the base member 12 in a second direction D21 and is adjustable relative to the second coupling structure 90 in a second additional direction D22 different from the second direction D21. The second additional direction D22 is non-parallel to the second direction D21.

In the present embodiment, the second coupling structure 90 couples the base member 12 and the second base 72 such that the second base 72 is adjustable relative to the base member 12 about a second axis A21 and is adjustable relative to the second coupling structure 90 about a second additional axis A22 different from the second axis A21. The second direction D21 is circumferentially defined about the second axis A21. The second additional direction D22 is circumferentially defined about the second additional axis A22. However, the second direction D21 can include a linear direction defined along the second axis A21 if needed and/or desired. The second additional direction D22 can include a linear direction defined along the second additional axis A22 if needed and/or desired.

The second coupling structure 90 includes a second intermediate member 92 and a second fastener 94. The second intermediate member 92 is at least partially provided between the base member 12 and the second base 72 to guide the second base 72 relative to the base member 12 in at least one of the second direction D21 and the second additional direction D22. The second fastener 94 is configured to fasten the second base 72 to the base member 12 to hold the second intermediate member 92 between the second base 72 and the base member 12.

The second coupling structure 90 has: a second fastening state where the second base 72 and the second intermediate member 92 are fastened to the base member 12 by the second fastener 94; and a second adjustable state where the second base 72 is coupled to the base member 12 by the second fastener 94 to be movable relative to the base member 12 in each of the second direction D21 and the second additional direction D22. For example, the second fastener 94 is tightened in the second fastening state. The second fastener 94 is loosened in the second fastening state. Thus, the second fastener 94 is configured to change a state of the second coupling structure 90 between the second fastening state and the second adjustable state.

Figure 17:
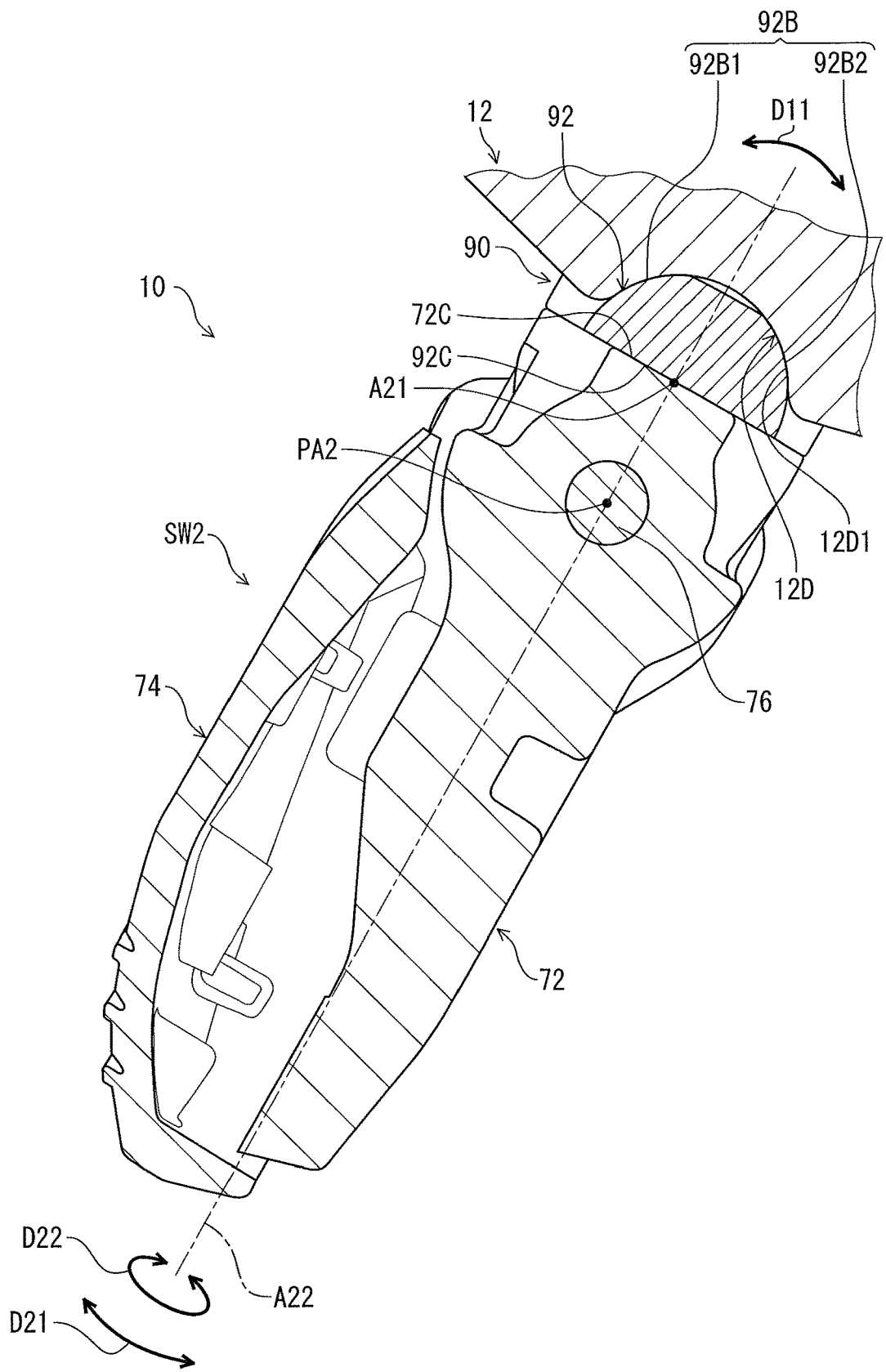
FIG. 17 is a cross-sectional view of the operating device taken along line XVII-XVII of FIG. 14.

As seen in FIG. 17, the second base 72 and the second intermediate member 92 are movable relative to the base member 12 in the second direction D21 in the second adjustable state. The second base 72 is movable relative to the second intermediate member 92 in the second additional direction D22 in the second adjustable state.

The second intermediate member 92 is at least partially provided between the base member 12 and the second base 72 to guide the second base 72 relative to the base member 12 about at least one of the second axis A21 and the second additional axis A22. In the present embodiment, the second intermediate member 92 is entirely provided between the base member 12 and the second base 72 to guide the second base 72 relative to the base member 12 about each of the second axis A21 and the second additional axis A22 However, the second intermediate member 92 can be partially provided between the base member 12 and the second base 72 to guide the second base 72 relative to the base member 12 about at least one of the second axis A21 and the second additional axis A22 if needed and/or desired.

As seen in FIG. 15, the second fastener 94 is at least partially provided in the second base 72. In the present embodiment, the second fastener 94 is partially provided in the second base 72. The second base 72 includes a second threaded hole 72F. The second fastener 94 includes a second externally threaded portion 94A engaged with the second threaded hole 72F. The second fastener 94 is partially provided in the second threaded hole 72F. However, the second fastener 94 can be entirely provided in the second base 72 if needed and/or desired.

The second fastener 94 extends along the second additional axis A22. The second fastener 94 has a second longitudinal center axis LA2 and extends along the second longitudinal center axis LA2. In the present embodiment, the second longitudinal center axis LA2 extends along the second additional axis A22. The second longitudinal center axis LA2 coincides with the second additional axis A22. However, the second longitudinal center axis LA2 can be offset from the second additional axis A22 if needed and/or desired.

The second fastener 94 includes a second rod 94B and a second head 94C. The second rod 94B extends along the second longitudinal center axis LA2. The second rod 94B includes the second externally threaded portion 94A. The second head 94C is provided at a longitudinal end of the second rod 94B. The second head 94C has an outer diameter larger than an outer diameter of the second rod 94B. In the present embodiment, the second fastener 94 is integrally provided as a one-piece unitary member. The second rod 94B is integrally provided with the second externally threaded portion 94A and the second head 94C. However, the second fastener 94 can include at least two separate parts if needed and/or desired.

The second coupling structure 90 includes a second washer 96. The second washer 96 includes a hole 96A. The second fastener 94 extends through the hole 96A of the second washer 96. The second washer 96 is held between the second head 94C of the second fastener 94 and the base member 12 in a state where the second base 72 is coupled to the base member 12 by the second fastener 94.

As seen in FIG. 15, the second fastener 94 is at least partially provided in the second intermediate member 92. The base member 12 includes a second opening 12C. The second fastener 94 extends through the second opening 12C. In the present embodiment, the second fastener 94 is partially provided in the second intermediate member 92. The second intermediate member 92 includes a second hole 92A. The second fastener 94 extends through the second hole 92A. However, the second fastener 94 can be entirely provided in the second intermediate member 92 if needed and/or desired.

As seen in FIG. 14, the second base 72 includes a second receiving portion 72R and a second protruding portion 72P. The second electrical switch 80 is attached to the second receiving portion 72R. The second protruding portion 72P protrudes from the second receiving portion 72R. The second protruding portion 72P is at least partially provided in the second hole 92A. The second threaded hole 72F is at least partially provided in the second protruding portion 72P.

In the present embodiment, the second protruding portion 72P is partially provided in the second hole 92A. The second protruding portion 72P is rotatable relative to the second intermediate member 92 about the second additional axis A22. The second protruding portion 72P is slidably contactable with an inner peripheral surface of the second hole 92A. The second threaded hole 72F is partially provided in the second protruding portion 72P. For example, the second protruding portion 72P has a tubular shape. However, the second protruding portion 72P can be entirely provided in the second hole 92A if needed and/or desired. The second threaded hole 72F can be entirely provided in the second protruding portion 72P if needed and/or desired. The second protruding portion 72P can have shapes other than the tubular shape if needed and/or desired.

As seen in FIG. 14, the second axis A21 intersects with the second additional axis A22. The second pivot axis PA2 intersects with the second additional axis A22. The second pivot axis PA2 is offset from the second axis A21. In the present embodiment, the second axis A21 is perpendicular to the second additional axis A22. The second pivot axis PA2 is perpendicular to the second additional axis A22. The second pivot axis PA2 is parallel to the second axis A21. However, the second axis A21 can be non-perpendicular to the second additional axis A22 if needed and/or desired. The second pivot axis PA2 can be non-perpendicular to the second additional axis A22 if needed and/or desired. The second pivot axis PA2 can be non-parallel to the second axis A21 if needed and/or desired.

Figure 18:
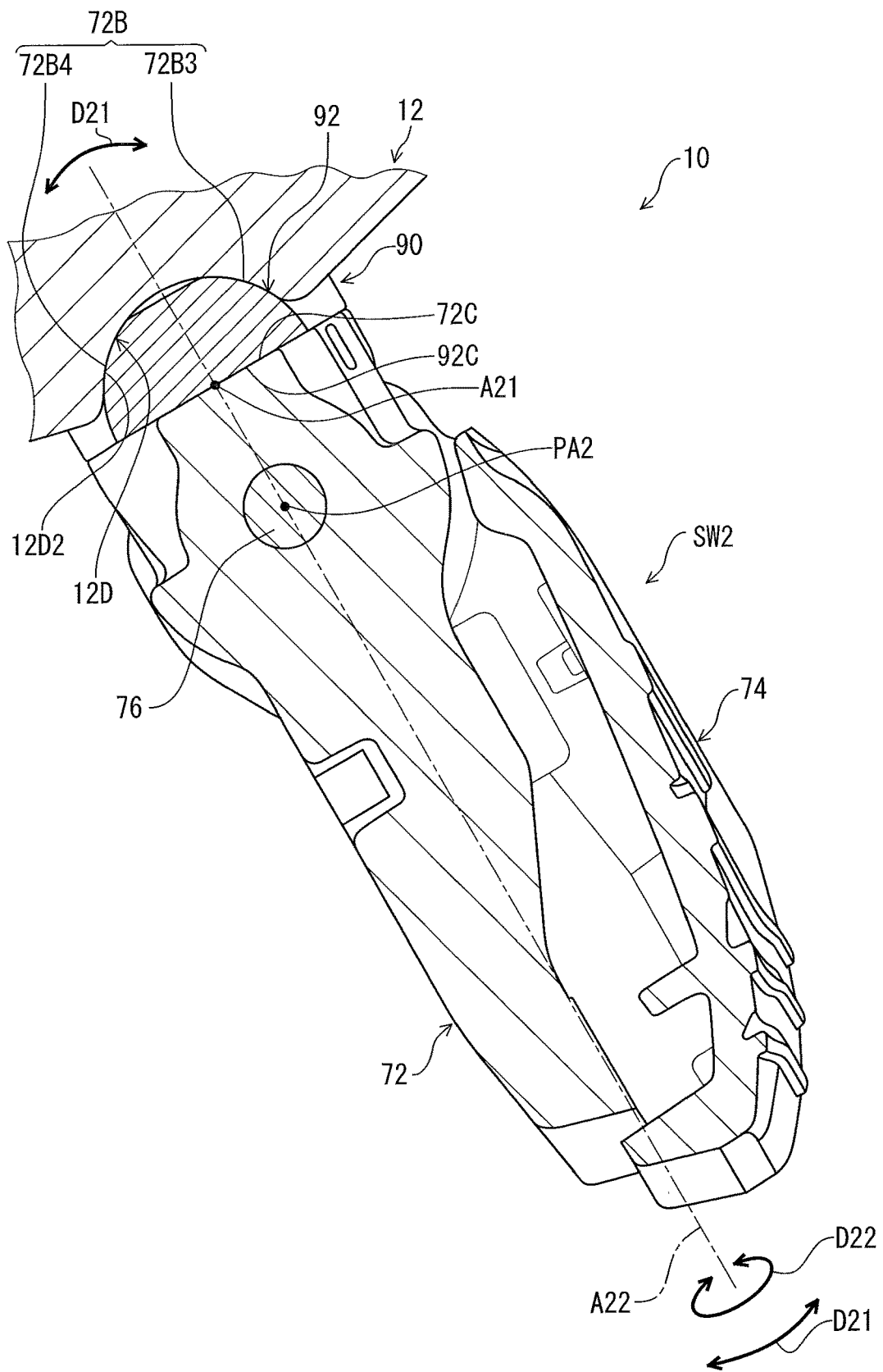
FIG. 18 is a cross-sectional view of the operating device taken along line XVIII-XVIII of FIG. 14.

As seen in FIGS. 17 and 18, the second intermediate member 92 is contactable with the base member 12 and the second base 72. The second intermediate member 92 includes a second contact surface 92B. The second contact surface 92B is contactable with the base member 12 to guide the second base 72 and the second intermediate member 92 relative to the base member 12 in the second direction D21. The base member 12 includes a second guide surface 12D. The second contact surface 92B is contactable with the second guide surface 12D to guide the second base 72 and the second intermediate member 92 relative to the base member 12 in the second direction D21.

In the present embodiment, the second contact surface 92B has a curved shape extending in the second direction D21. The second contact surface 92B extends in the second direction D21 about the second axis A21. The second guide surface 12D has a curved shape extending in the second direction D21. The second guide surface 12D extends in the second direction D21 about the second axis A21. A curvature radius of the second contact surface 92B is equal to a curvature radius of the second guide surface 12D. In the present embodiment, the second contact surface 92B has a curved convex shape. The second guide surface 12D has a curved concave shape. However, the second contact surface 92B can have a curved concave shape if needed and/or desired. The second guide surface 12D has a curved convex shape if needed and/or desired.

In the present embodiment, the second contact surface 92B includes second contact surfaces 92B1, 92B2, 92B3, and 92B4. The second guide surface 12D includes second guide surfaces 12D1 and 12D2.

As seen in FIG. 17, the second contact surfaces 92B1 and 92B2 are contactable with the second guide surface 12D1. The second contact surface 92B1 has a curved shape extending in the second direction D21. The second contact surface 92B1 extends in the second direction D21 about the second axis A21. The second contact surface 92B2 has a curved shape extending in the second direction D21. The second contact surface 92B2 extends in the second direction D21 about the second axis A21. The second guide surface 12D1 has a curved shape extending in the second direction D21. The second guide surface 12D1 extends in the second direction D21 about the second axis A21.

In the present embodiment, the second contact surface 92B1 is spaced apart from the second contact surface 92B2. The second guide surface 12D1 is integrally provided as a single continuous surface. However, the second contact surface 92B1 can be integrally provided with the second contact surface 92B2 as a single continuous surface if needed and/or desired. The second guide surface 12D1 can include separate surfaces if needed and/or desired.

As seen in FIG. 18, the second contact surfaces 92B3 and 92B4 are contactable with the second guide surface 12D2. The second contact surface 92B3 has a curved shape extending in the second direction D21. The second contact surface 92B3 extends in the second direction D21 about the second axis A21. The second contact surface 92B4 has a curved shape extending in the second direction D21. The second contact surface 92B4 extends in the second direction D21 about the second axis A21. The second guide surface 12D2 has a curved shape extending in the second direction D21. The second guide surface 12D2 extends in the second direction D21 about the second axis A21.

In the present embodiment, the second contact surface 92B3 is spaced apart from the second contact surface 92B4. The second guide surface 12D2 is integrally provided as a single continuous surface. However, the second contact surface 92B3 can be integrally provided with the second contact surface 92B4 as a single continuous surface if needed and/or desired. The second guide surface 12D2 can include separate surfaces if needed and/or desired.

The second intermediate member 92 has substantially the same structure as the structure of the first intermediate member 52 of the first coupling structure 50. FIGS. 10 and 11 can be utilized as the perspective views of the second intermediate member 92.

As seen in FIG. 10, the second contact surface 92B1 is spaced apart from the second contact surfaces 92B2, 92B3, and 92B4. The second contact surface 92B2 is spaced apart from the second contact surfaces 92B1, 92B3, and 92B4. The second contact surface 92B3 is spaced apart from the second contact surfaces 92B1, 92B2, and 92B4. The second contact surface 92B4 is spaced apart from the second contact surfaces 92B1, 92B2, and 92B3. The second hole 92A is provided between the second contact surfaces 92B1 and 92B3. The second hole 92A is provided between the second contact surfaces 92B2 and 92B4. However, the arrangement of the second contact surfaces 92B1, 92B2, 92B3, and 92B4 is not limited to the illustrated embodiment.

As seen in FIGS. 17 and 18, the second intermediate member 92 includes a second additional contact surface 92C. The second additional contact surface 92C is contactable with the second base 72 to guide the second base 72 relative to the second intermediate member 92 in the second additional direction D22. The second base 72 includes a second additional guide surface 72C. The second contact surface 92B is contactable with the second additional guide surface 72C to guide the second base 72 relative to the base member 12 in the second additional direction D22.

As seen in FIG. 11, the second additional contact surface 92C has a flat shape extending in the second additional direction D22. The second additional contact surface 92C has an annular shape extending in the second additional direction D22. As seen in FIGS. 17 and 18, the second additional contact surface 92C is perpendicular to the second additional axis A22. The second additional guide surface 72C has a flat shape. The second additional guide surface 72C is perpendicular to the second additional axis A22. However, the second additional contact surface 92C can have shapes other than the flat shape and/or the annular shape if needed and/or desired. The second additional guide surface 72C can have shapes other than the flat shape and/or the annular shape if needed and/or desired. However, the second additional contact surface 92C can have shapes other than the flat shape and/or the annular shape if needed and/or desired.

As seen in FIG. 12, the operating device 10 further comprises a second indicator 100. The second indicator 100 is provided to at least one of the base member 12, the second switch unit SW2, and the second coupling structure 90 to indicate a relative position between at least two of the base member 12, the second switch unit SW2, and the second coupling structure 90.

In the present embodiment, the second indicator 100 is provided to the base member 12 and the second coupling structure 90 to indicate a relative position between the base member 12 and the second coupling structure 90. The second indicator 100 is provided to the second switch unit SW2 and the second coupling structure 90 to indicate a relative position between the second switch unit SW2 and the second coupling structure 90.

Specifically, the second indicator 100 is provided to the base member 12 and the second intermediate member 92 to indicate a relative position between the base member 12 and the second intermediate member 92. The second indicator 100 is provided to the second base 72 and the second intermediate member 92 to indicate a relative position between the second base 72 and the second intermediate member 92. However, the second indicator 100 can be provided to portions of the second coupling structure 90 other than the second intermediate member 92 if needed and/or desired. The second indicator 100 can be provided to portions of the second switch unit SW2 other than the second base 72 if needed and/or desired. The second indicator 100 can be at least partially omitted from the operating device 10 if needed and/or desired.

In the present embodiment, the second indicator 100 includes a first mark 102, a second mark 104, and a third mark 106. The first mark 102 is provided to the base member 12. The second mark 104 is provided to the second switch unit SW2. The third mark 106 is provided to the second coupling structure 90.

The first mark 102 and the third mark 106 are respectively provided to the base member 12 and the second coupling structure 90 to indicate the relative position between the base member 12 and the second coupling structure 90. The second mark 104 and the third mark 106 are respectively provided to the second switch unit SW2 and the second coupling structure 90 to indicate the relative position between the second switch unit SW2 and the second coupling structure 90.

The first mark 102 and the third mark 106 are respectively provided to the base member 12 and the second intermediate member 92 to indicate the relative position between the base member 12 and the second intermediate member 92. The second mark 104 and the third mark 106 are respectively provided to the second base 72 and the second intermediate member 92 to indicate the relative position between the second base 72 and the second intermediate member 92.

The first mark 102 includes at least one first linear portion 102A and/or 102B provided to the base member 12. The first linear portion 102A linearly extends and has an elongated shape. The first linear portion 102B linearly extends and has an elongated shape. In the present embodiment, the first mark 102 includes at least one first linear portion 102A and at least one first linear portion 102B. A total number of the first linear portions 102A and 102B is seven. A total number of the first linear portion 102A is three. A total number of the first linear portion 102B is four. The first linear portions 102A and 102B are arranged about the second axis A21 in the second direction D21 at regular intervals. The first linear portion 102A has a length different from a length of the first linear portion 102B. The length of the first linear portion 102A is longer than the length of the first linear portion 102B. However, the length of the first linear portion 102A can be shorter than or equal to the length of the first linear portion 102B if needed and/or desired. The total number of the first linear portions 102A and 102B is not limited to seven. The total number of the first linear portions 102A is not limited to three. The total number of the first linear portions 102B is not limited to four. The first mark 102 can include at least one first linear portion 102A and/or 102B if needed and/or desired. The first mark 102 can include any letters, symbols, and signs configured to indicate the relative position between the base member 12 and the second coupling structure 90 if needed and/or desired.

The second mark 104 includes at least one second linear portion 104A provided to the second switch unit SW2. The second linear portion 104A linearly extends and has an elongated shape. In the present embodiment, the at least one second linear portion 104A is provided to the second base 72. The second mark 104 includes at least two second linear portion 104A. A total number of the second linear portions 104A is seven. The second linear portions 104A are arranged about the second additional axis A22 in the second additional direction D22 at regular intervals. A length of one of the second linear portions 104A is equal to a length of another of the second linear portions 104A. However, the length of at least one of the second linear portions 104A can be different from the length of another of the second linear portions 104A if needed and/or desired. The total number of the second linear portions 104A is not limited to seven. The second mark 104 can include at least one second linear portion 104A if needed and/or desired. The second mark 104 can include any letters, symbols, and signs configured to indicate the relative position between the second switch unit SW2 and the second coupling structure 90 if needed and/or desired.

The third mark 106 includes at least one third linear portion 106A provided to the second coupling structure 90. The third linear portion 106A linearly extends and has an elongated shape. In the present embodiment, the at least one third linear portion 106A is provided to the second intermediate member 92. A total number of the third linear portion 106A is one. The third linear portion 106A extends radially outwardly relative to the second axis A21 as viewed along the second axis A21. The third linear portion 106A extends along the second additional axis A22 as viewed along the second axis A21. However, the total number of the third linear portion 106A is not limited to one. The third mark 106 can include at least one third linear portion 106A if needed and/or desired. The third mark 106 can include any letters, symbols, and signs configured to indicate the relative position between the base member 12 and the second coupling structure 90 and/or between the second switch unit SW2 and the second coupling structure 90 if needed and/or desired.

As seen in FIG. 12, the first switch unit SW1 is pivotable relative to the base member 12 about the first axis A11 between first end positions EP11A and EP11B. The first switch unit SW1 is pivotable relative to the base member 12 about the first axis A11 in a first pivotable range PR11. The first end positions EP11A and EP11B are defined based on the first longitudinal center axis LA1 of the first fastener 54 (see e.g., FIG. 6). The first pivotable range PR11 is defined between the first end positions EP11A and EP11B. The first end position EP11A corresponds to the first linear portion 62A provided one circumferential end of the first mark 62. The first end position EP11B corresponds to the first linear portion 62A provided the other circumferential end of the first mark 62. The first pivotable range PR11 is defined by at least one of a length of the electric cable 44, a contact between the base member 12 and the first switch unit SW1, and a contact between the base member 12 and the first coupling structure 50.

The second switch unit SW2 is pivotable relative to the base member 12 about the second axis A21 between second end positions EP21A and EP21B. The second switch unit SW2 is pivotable relative to the base member 12 about the second axis A21 in a second pivotable range PR21. The second end positions EP21A and EP21B are defined based on the second longitudinal center axis LA2 of the second fastener 94 (see e.g., FIG. 15). The second pivotable range PR21 is defined between the second end positions EP21A and EP21B. The second end position EP21A corresponds to the first linear portion 102A provided one circumferential end of the first mark 102. The second end position EP21B corresponds to the first linear portion 102A provided the other circumferential end of the first mark 102. The second pivotable range PR21 is defined by at least one of a length of the electric cable 84, a contact between the base member 12 and the second switch unit SW2, and a contact between the base member 12 and the second coupling structure 90.

Figure 19:
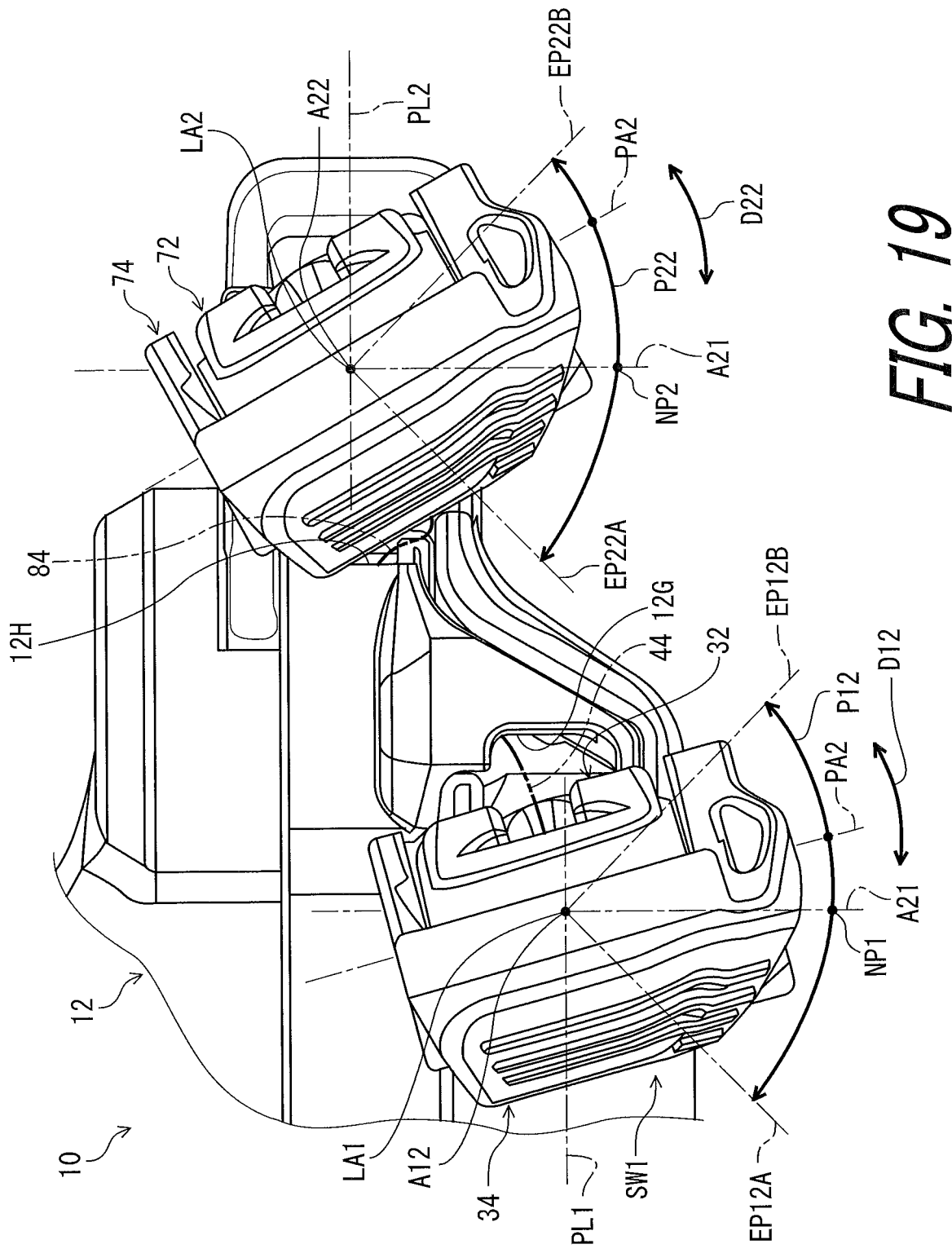
FIG. 19 is a side-elevational view of the operating device illustrated in FIG. 3.

As seen in FIG. 19, the first switch unit SW1 is pivotable relative to the base member 12 about the first additional axis A12 between first additional end positions EP12A and EP12B. The first switch unit SW1 is pivotable relative to the base member 12 about the first additional axis A12 in a first additional pivotable range PR12. The first additional end positions EP12A and EP12B are defined based on the first pivot axis PA1. The first additional pivotable range PR12 is defined between the first additional end positions EP12A and EP12B. The first additional end position EP12A corresponds to the second linear portion 64A (see e.g., FIG. 12) provided one circumferential end of the second mark 64. The first additional end position EP12B corresponds to the second linear portion 64A (see e.g., FIG. 12) provided the other circumferential end of the second mark 64. The first additional pivotable range PR12 is defined by at least one of a length of the electric cable 44, a contact between the base member 12 and the first switch unit SW1, and a contact between the base member 12 and the first coupling structure 50 (see e.g., FIG. 12).

The second switch unit SW2 is pivotable relative to the base member 12 about the second additional axis A22 between second additional end positions EP22A and EP22B. The second switch unit SW2 is pivotable relative to the base member 12 about the second additional axis A22 in a second additional pivotable range PR22. The second additional end positions EP22A and EP22B are defined based on the second pivot axis PA2. The second additional pivotable range PR22 is defined between the second additional end positions EP22A and EP22B. The second additional end position EP22A corresponds to the second linear portion 104A (see e.g., FIG. 12) provided one circumferential end of the second mark 104. The second additional end position EP22B corresponds to the second linear portion 104A (see e.g., FIG. 12) provided the other circumferential end of the second mark 104. The second additional pivotable range PR22 is defined by at least one of a length of the electric cable 84, a contact between the base member 12 and the second switch unit SW2, and a contact between the base member 12 and the second coupling structure 90 (see e.g., FIG. 12).

As seen in FIG. 12, the first longitudinal center axis LA1 extends along the second longitudinal center axis LA2 in a neutral state where the first switch unit SW1 is in a first neutral position NP1 and where the second switch unit SW2 is in a second neutral position NP2. The first neutral position NP1 is defined in a middle position of the first pivotable range PR11 and in a middle position of the first additional pivotable range PR12. The second neutral position NP2 is defined in a middle position of the second pivotable range PR21 and in a middle position of the second additional pivotable range PR22. In the present embodiment, the first longitudinal center axis LA1 is parallel to the second longitudinal center axis LA2 in the neutral state. However, the first longitudinal center axis LA1 can be non-parallel to the second longitudinal center axis LA2 in the neutral state if needed and/or desired.

As seen in FIG. 19, the first longitudinal center axis LA1 is movable on a first movement plane PL1 in response to a pivotal movement of the first switch unit SW1 about the first axis A11. The first movement plane PL1 is defined based on a locus of the first longitudinal center axis LA1. The second longitudinal center axis LA2 is movable on a second movement plane PL2 in response to a pivotal movement of the second switch unit SW2 about the second axis A21. The second movement plane PL2 is defined based on a locus of the second longitudinal center axis LA2.

In the present embodiment, the first axis A11 is parallel to the second axis A21. The first movement plane PL1 is parallel to the second movement plane PL2. Thus, the first longitudinal center axis LA1 can be skew relative to the second longitudinal center axis LA2 in a state other than the neutral state. The first longitudinal center axis LA1 does not intersect with the second longitudinal center axis LA2 in the state other than the neutral state. However, the first axis A11 can be non-parallel to the second axis A21 if needed and/or desired. The first movement plane PL1 can be non-parallel to the second movement plane PL2 if needed and/or desired. The first longitudinal center axis LA1 can be arranged to intersect with the second longitudinal center axis LA2 in the state other than the neutral state if needed and/or desired.

As seen in FIGS. 3 to 19, the first switch unit SW1 has substantially the same structure as the structure of the second switch unit SW2. However, the first switch unit SW1 can have a structure different from a structure of the second switch unit SW2 if needed and/or desired. One of the first switch unit SW1 and the second switch unit SW2 can be omitted from the operating device 10 if needed and/or desired. The position of the first switch unit SW1 and the position of the second switch unit SW2 can be exchanged if needed and/or desired.

Figure 20:
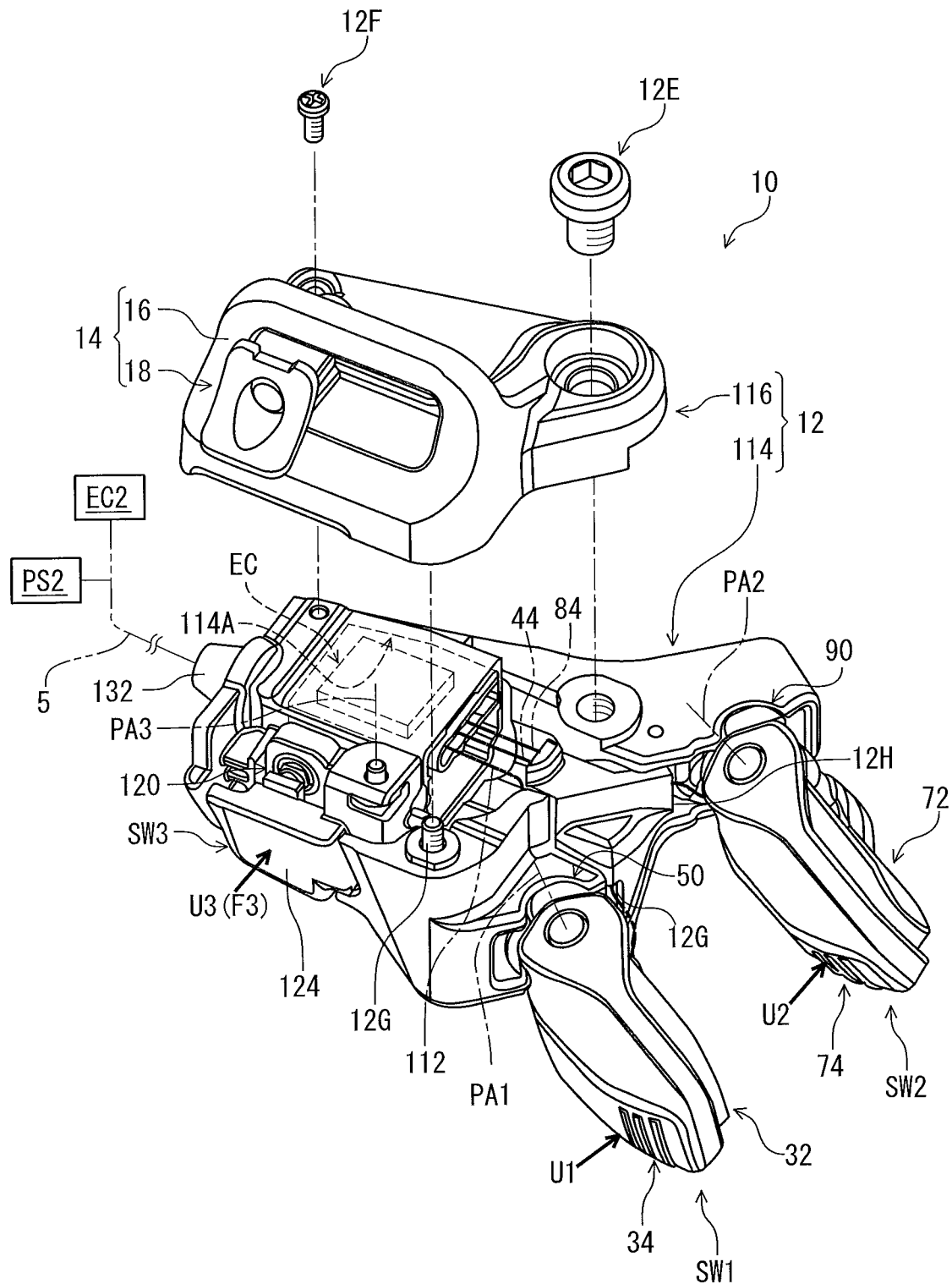
FIG. 20 is an exploded perspective view of the operating device illustrated in FIG. 3.

As seen in FIG. 20, the operating device 10 further comprises electronic circuitry EC provided to the base member 12. The electric cable 44 electrically connects the electronic circuitry EC and the first switch unit SW1. The electric cable 84 electrically connects the electronic circuitry EC and the second switch unit SW2. The electric cable 44 extends from the first switch unit SW1 to the electronic circuitry EC through a cable opening 12G of the base member 12. The electric cable 84 extends from the second switch unit SW2 to the electronic circuitry EC through a cable opening 12H of the base member 12.

The operating device 10 comprises a third switch unit SW3 and an electric cable 112. The electric cable 112 electrically connects the electronic circuitry EC and the third switch unit SW3.

The base member 12 includes a first base body 114 and a second base body 116. The second base body 116 is detachably and reattachably secured to the first base body 114 with fasteners 12E, 12F, and 12G. The first switch unit SW1 is coupled to the first base body 114 via the first coupling structure 50. The second switch unit SW2 is coupled to the first base body 114 via the second coupling structure 90.

The first base body 114 includes an accommodation space 114A. The electronic circuitry EC is provided in the accommodation space 114A. The electronic circuitry EC is provided between the first base body 114 and the second base body 116 in a state where the second base body 116 is secured to the first base body 114. The mounting base 16 of the mounting structure 14 is coupled to the second base body 116. The first base body 114 includes a plurality of separate parts. However, the first base body 114 can be integrally provided as a one-piece unitary member if needed and/or desired.

The third switch unit SW3 is configured to be activated in response to a third user operation U3. The third user operation U3 includes a third operating force F3. Thus, the third switch unit SW3 is configured to be activated in response to the third operating force F3. The third switch unit SW3 includes a third electrical switch 120 and a third operating member 124. The third electrical switch 120 has substantially the same structure as the structure of the first electrical switch 40 of the first switch unit SW1. Thus, it will not be described in detail here for the sake of brevity. The third switch unit SW3 can be omitted from the operating device 10 if needed and/or desired.

The third operating member 124 is pivotally coupled to the base member about a third pivot axis PA3. The third operating member 124 is configured to receive the third user operation U3. The third operating member 124 is configured to transmit the third user operation U3 to the third electrical switch 120.

Figure 21:
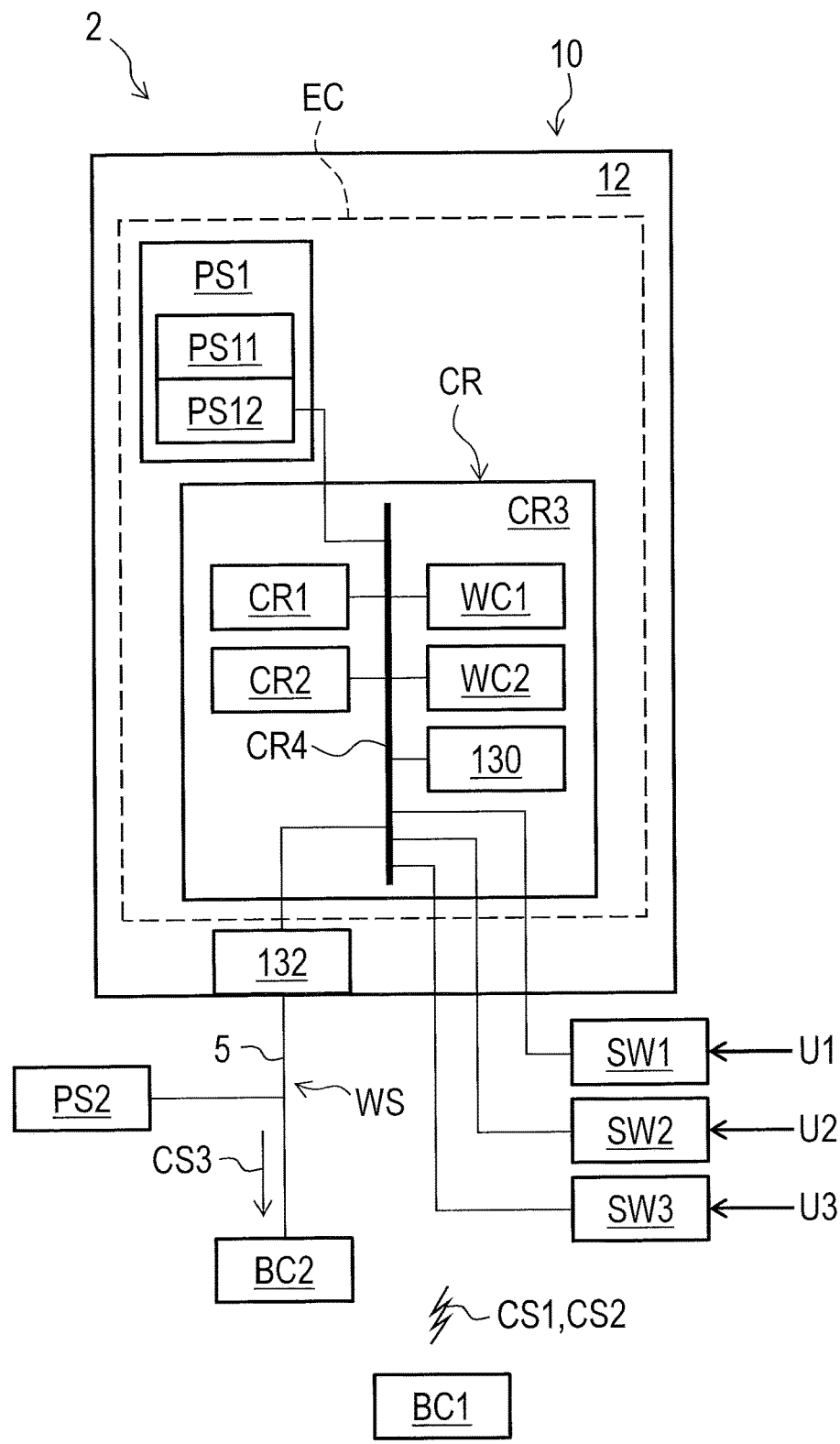
FIG. 21 is a schematic block diagram of the human-powered vehicle including the operating device illustrated, in FIG. 1.

As seen in FIG. 21, the electronic circuitry EC includes an electronic controller CR, a wireless communicator WC1, and a wired communicator WC2, an informing unit 130, and a connection port 132. The electronic controller CR is configured to be electrically connected to the first switch unit SW1, the second switch unit SW2, the third switch unit SW3, the wireless communicator WC1, the wired communicator WC2, the informing unit 130, and the connection port 132.

The electronic controller CR includes a hardware processor CR1, a hardware memory CR2, and a circuit board CR3, and a system bus CR4. The hardware processor CR1 is coupled to the hardware memory CR2. The hardware memory CR2 is coupled to the hardware processor CR1. The hardware processor CR1 and the hardware memory CR2 are electrically mounted on the circuit board CR3. The hardware processor CR1 is electrically connected to the hardware memory CR2 via the circuit board CR3 and the system bus CR4. The hardware memory CR2 is electrically connected to the hardware processor CR1 via the circuit board CR3 and the system bus CR4. The system bus CR4 is provided on the circuit board CR3. For example, the electronic circuitry EC includes a semiconductor. The hardware processor CR1 includes a semiconductor. The hardware memory CR2 includes a semiconductor.

For example, the hardware processor CR1 includes at least one of a central processing unit (CPU), a micro processing unit (MPU), and a memory controller. The hardware memory CR2 is electrically connected to the hardware processor CR1. For example, the hardware memory CR2 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The hardware memory CR2 includes storage areas each having an address. The hardware processor CR1 is configured to control the hardware memory CR2 to store data in the storage areas of the hardware memory CR2 and reads data from the storage areas of the hardware memory CR2. The hardware memory CR2 can also be referred to as a computer-readable storage medium CR2.

The electronic circuitry EC is configured to execute at least one control algorithm of the operating device 10. For example, the electronic circuitry EC is programed to execute at least one control algorithm of the operating device 10. The hardware memory CR2 stores at least one program including at least one program instruction. The at least one program is read into the hardware processor CR1, and thereby the at least one control algorithm of the operating device 10 is executed based on the at least one program. The electronic controller CR can also be referred to as an electronic controller circuit or circuitry CR. The electronic controller CR can also be referred to as an electronic hardware controller circuit or circuitry CR.

The structure of the hardware processor CR1 is not limited to the above structure. The structure of the hardware processor CR1 is not limited to the hardware processor CR1, the hardware memory CR2, the circuit board CR3, and the system bus CR4. The hardware processor CR1 can be realized by hardware alone or a combination of hardware and software. The hardware processor CR1 and the hardware memory CR2 can be integrated as a one chip such as an application specific integrated circuit (ASIC) or a field programmable gate array (FPGA).

As seen in FIG. 21, the wireless communicator WC1 is configured to wirelessly communicate with at least one electric device such as the electric device BC1. The wireless communicator WC1 is electrically connected to the hardware processor CR1 and the hardware memory CR2 with the circuit board CR3 and the system bus CR4. The wireless communicator WC1 is electrically mounted on the circuit board CR3. The wireless communicator WC1 includes a signal transmitting circuit or circuitry, a signal receiving circuit or circuitry, and an antenna. Thus, the wireless communicator WC1 can also be referred to as a wireless communicator circuit or circuitry WC1.

The wireless communicator WC1 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the wireless communicator WC1 is configured to encrypt signals using a cryptographic key to generate encrypted wireless signals. The wireless communicator WC1 is configured to transmit wireless signals via the antenna. The wireless communicator WC1 can be a one-way wireless communication device such as a receiver, or a two-way wireless communication device such as a transceiver.

For example, the wireless communicator WC1 is configured to receive wireless signals via the antenna. In the present embodiment, the wireless communicator WC1 is configured to decode the wireless signals to recognize signals transmitted from other wireless communicators. The wireless communicator WC1 is configured to decrypt the wireless signals using the cryptographic key.

As seen in FIG. 21, the wired communicator WC2 is configured to communicate with at least one electric device such as the electric device BC2 via the electric cable 5. The wired communicator WC2 is electrically connected to the hardware processor CR1 and the hardware memory CR2 with the circuit board CR3 and the system bus CR4. The wired communicator WC2 is electrically mounted on the circuit board CR3. The wired communicator WC2 includes a signal transmitting circuit or circuitry and a signal receiving circuit or circuitry. Thus, the wired communicator WC2 can also be referred to as a wired communicator circuit or circuitry WC2.

The wired communicator WC2 is configured to communicate with the electric device BC2 via a wired communication channel. The connection port 132 is electrically connected to the wired communicator WC2. The wired communicator WC2 is electrically connected to the electronic controller CR. The wired communicator WC2 is configured to communicate with the electric device BC2 via the electric cable 5 detachably connected to the connection port 132. However, the wired communicator WC2 can be omitted from the electronic circuitry EC if needed and/or desired.

For example, the wired communicator WC2 is configured to communicate with an additional wired communicator of the electric device BC2 via a wired communication structure WS including the electric cable 5 using power line communication (PLC) technology. More specifically, the wired communication structure WS includes a ground line and a voltage line that are detachably connected to a serial bus that is formed by communication interfaces. In the present embodiment, the wired communicator WC2 is configured to communicate with the additional electric component through the voltage line using the PLC technology. However, the wired communicator WC2 can be configured to communicate with the additional electric component using wired communication technologies other than the PLC technology. Since the PLC technology has been known, it will not be described in detail here for the sake of brevity.

As seen in FIG. 21, the operating device 10 includes an electric power source PS1. The electric power source PS1 is configured to supply electricity to the electronic controller CR, the wireless communicator WC1, the wired communicator WC2, and the informing unit 130. The electric power source PS1 includes a battery PS11 and a battery holder PS12. The battery holder PS12 is electrically connected to the electronic controller CR, the wireless communicator WC1, the wired communicator WC2, and the informing unit 130. The battery holder PS12 is configured to detachably and reattachably hold the battery PS11. Examples of the battery PS11 include a primary battery and a secondary battery.

The human-powered vehicle 2 includes an additional electric power source PS2. The additional electric power source PS2 is configured to supply electricity to the electric device BC2. The operating device 10 is electrically connected to the additional electric power source PS2 via the wired communication structure WS. The additional electric power source PS2 is configured to supply electricity to the operating device 10 via the wired communication structure WS. Thus, the operating device 10 is configured to be powered by at least one of the electric power source PS1 and the additional electric power source PS2. However, one of the electric power source PS1 and the additional electric power source PS2 can be omitted from the human-powered vehicle 2 if needed and/or desired. In a case where the additional electric power source PS2 is omitted, the electric device BC2 can include an electric power source.

The electronic controller CR is configured to detect connection between the connection port 132 and the electric cable 5. The electronic controller CR is configured to control the wired communicator WC2 to communicate with the electric device BC2 if the electronic controller CR detects the connection between the connection port 132 and the electric cable 5 connected to the electric device BC2. In a case where the electric device BC2 includes an additional operating device such as a satellite operating device (e.g., a satellite switch), the electronic controller CR is configured to control another component such as the electric device BC1 based on a control signal transmitted from the electric device BC2 or other components via the electric cable 5 and the connection port 132. In a case where the electric device BC2 includes an operated component, the electronic controller CR is configured to transmit a control signal to the operated component via the connection port 132 and the electric cable 5.

The electronic controller CR is configured to update firmware stored in the hardware memory CR2 via the connection port 132 in a case where a device configured to update firmware is electrically connected to the connection port 132.

The electronic controller CR is configured to control another device in response to the first user operation U1, the second user operation U2, the third user operation U3, and/or other information. In the present embodiment, the electronic controller CR is configured to generate a control signal CS1 in response to the activation of the first switch unit SW1. The electronic controller CR is configured to generate a control signal CS2 in response to the activation of the second switch unit SW2. The electronic controller CR is configured to generate a control signal CS3 in response to the activation of the third switch unit SW3.

For example, the electronic controller CR is configured to control the wireless communicator WC1 to wirelessly transmit at least one of the control signals CS1, CS2, and CS3 to the electric device BC1. In a case where the electric device BC1 includes a gear-changing device, the electronic controller CR is configured to control the wireless communicator WC1 to wirelessly transmit the control signals CS1 and CS2 to the electric device BC1 in response to the first user operation U1 and the second user operation U2, respectively. The control signal CS1 indicates one of upshifting and downshifting of the electric device BC1. The control signal CS2 indicates the other of upshifting and downshifting of the electric device BC1. However, the electric device BC1 is not limited to the gear-changing device. The electric device BC1 can include an adjustable seatpost, a suspension, an assist driving unit, a light emitting device, and a cyclocomputer if needed and/or desired.

In a case where the electric device BC2 includes an operated device, the electronic controller CR is configured to control the wired communicator WC2 to transmit at least one of the control signals CS1, CS2, and CS3 to the electric device BC2 via the electric cable 5. For example, in a case where the electric device BC2 includes an adjustable seatpost, the electronic controller CR is configured to control the wired communicator WC2 to transmit the control signal CS3 to the electric device BC2 via the electric cable 5 in response to the third user operation U3. The control signal CS3 indicates changing a state of the electric device BC2 between a lock state and an adjustable state. However, the electric device BC2 is not limited to the adjustable seatpost. The electric device BC2 can include a gear-changing device, a satellite operating device, a suspension, an assist driving unit, a light emitting device, and a cyclocomputer if needed and/or desired.

In a case where the electric device BC2 includes a satellite operating device, the electronic controller CR is configured to control the wired communicator WC2 to receive a signal from the electric device BC2 and is configured to control the wireless communicator WC1 to wirelessly transmit the signal to the electric device BC1 or another electric device. However, the electric device BC2 is not limited to the satellite operating device. The electric device BC2 can include a gear-changing device, an adjustable seatpost, a suspension, an assist driving unit, a light emitting device, and a cyclocomputer if needed and/or desired.

The informing unit 130 is configured to inform the user of a state of the operating device 10. Examples of the state of the operating device 10 includes a communication state of the wireless communicator WC1, a communication state of the wired communicator WC2, a level of remaining electricity of the electric power source PS1, and a pairing state of the wireless communicator WC1. Examples of the informing unit 130 include a light emitting device such as a light-emitting diode (LED), a vibration generator, and a loudspeaker.

Figure 22:
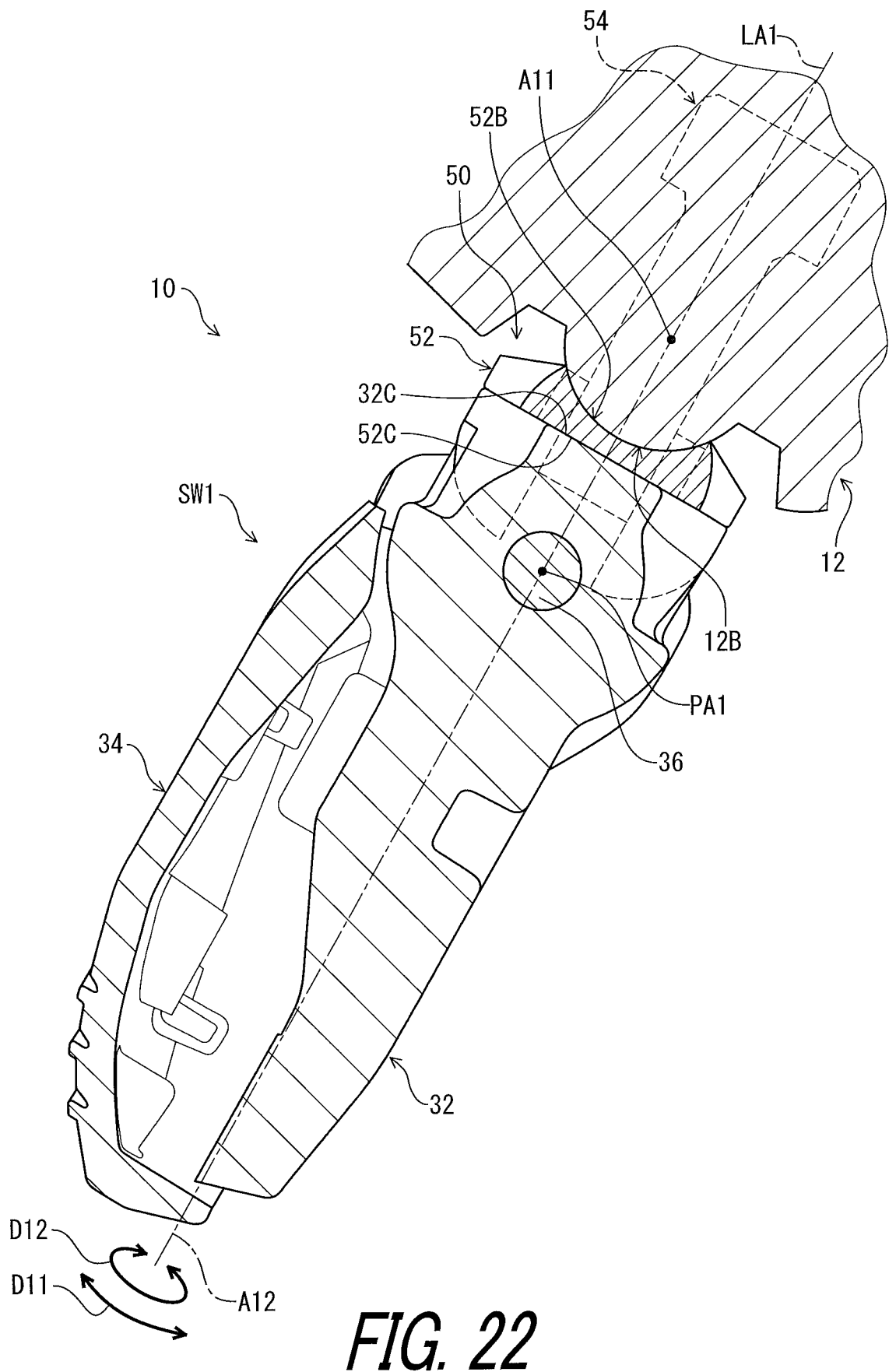
FIG. 22 is a cross-sectional view of an operating device in accordance with a modification.

In the above embodiment and the modifications thereof, as seen in FIGS. 8 and 9, the first contact surface 52B has the curved convex shape, and the first guide surface 12B has a curved concave shape. As seen in FIG. 22, however, the first contact surface 52B can have a curved concave shape if needed and/or desired. The first guide surface 12B can have a curved convex shape if needed and/or desired. The structure depicted in FIG. 22 can be applied to the second contact surface 92B of the second switch unit SW2 and the second guide surface 12D of the base member 12 if needed and/or desired.

Figure 23:
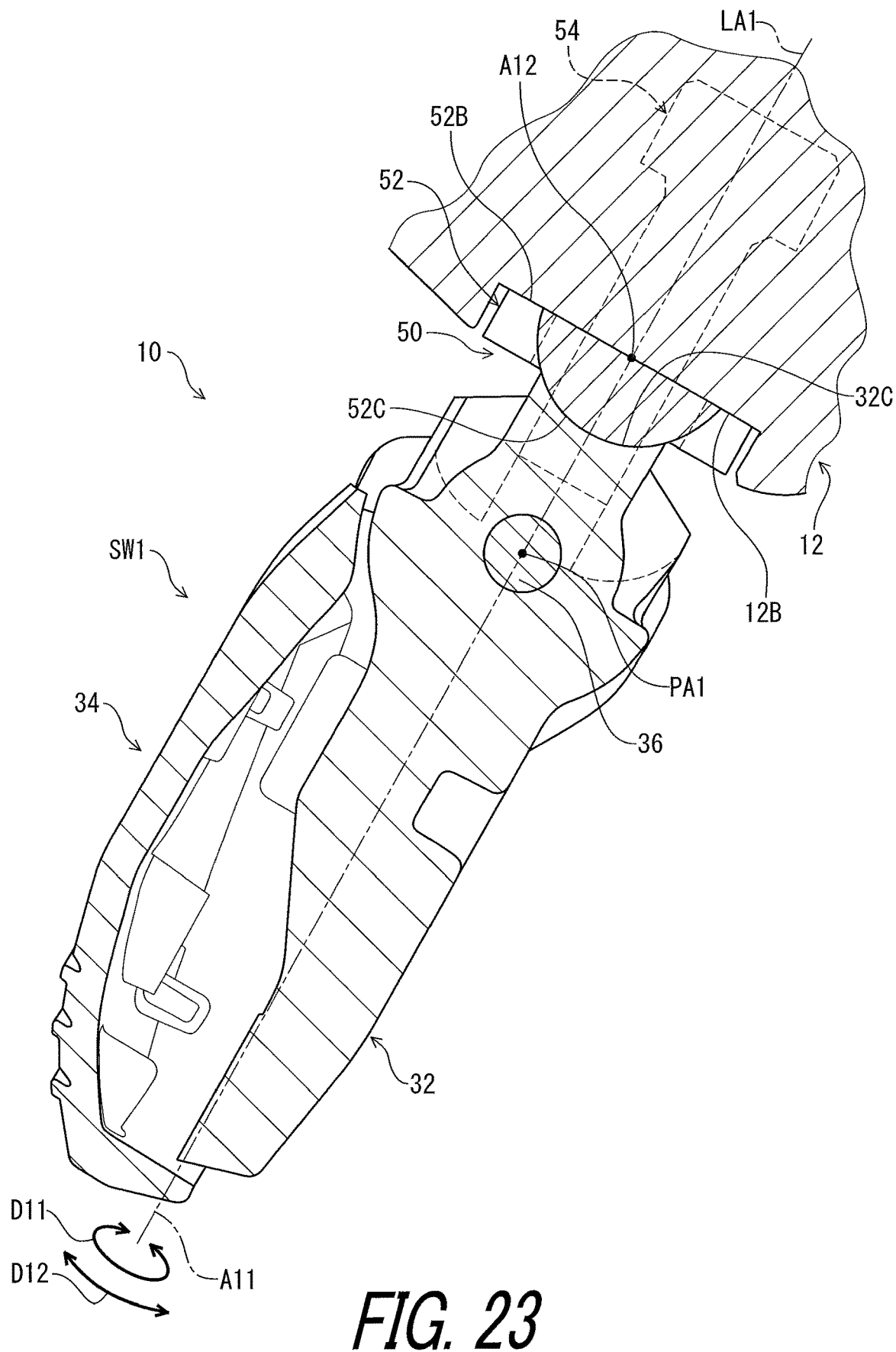
FIG. 23 is a cross-sectional view of an operating device in accordance with a modification.

In the above embodiment and the modifications thereof, as seen in FIG. 6, the first axis A11 is arranged to extend along the first longitudinal center axis LA1 of the first fastener 54. As seen in FIG. 23, however, the first additional axis A12 can be arranged to extend along the first longitudinal center axis LA1 of the first fastener 54 if needed and/or desired. In the modification depicted in FIG. 23, the first additional axis A12 is parallel to the first pivot axis PA1 The first contact surface 52B is contactable with the base member 12 to guide the first base 32 and the first intermediate member 52 relative to the base member 12 in the first direction D11. The first contact surface 52B is contactable with the first guide surface 12B to guide the first base 32 and the first intermediate member 52 relative to the base member 12 in the first direction D11. The first additional contact surface 52C is contactable with the first base 32 to guide the first base 32 relative to the first intermediate member 52 in the first additional direction D12. The first additional contact surface 52C is contactable with the first additional guide surface 32C to guide the first base 32 relative to the base member 12 in the first additional direction D12. The first contact surface 52B has a flat shape extending in the first direction D11. The first guide surface 12B is has a flat shape extending in the first direction D11. The first contact surface 52B and the first guide surface 12B are perpendicular to the first axis A11. The first additional contact surface 52C has a curved shape extending in the first additional direction D12. The first additional guide surface 32C has a curved shape extending in the first additional direction D12.

Figure 24:
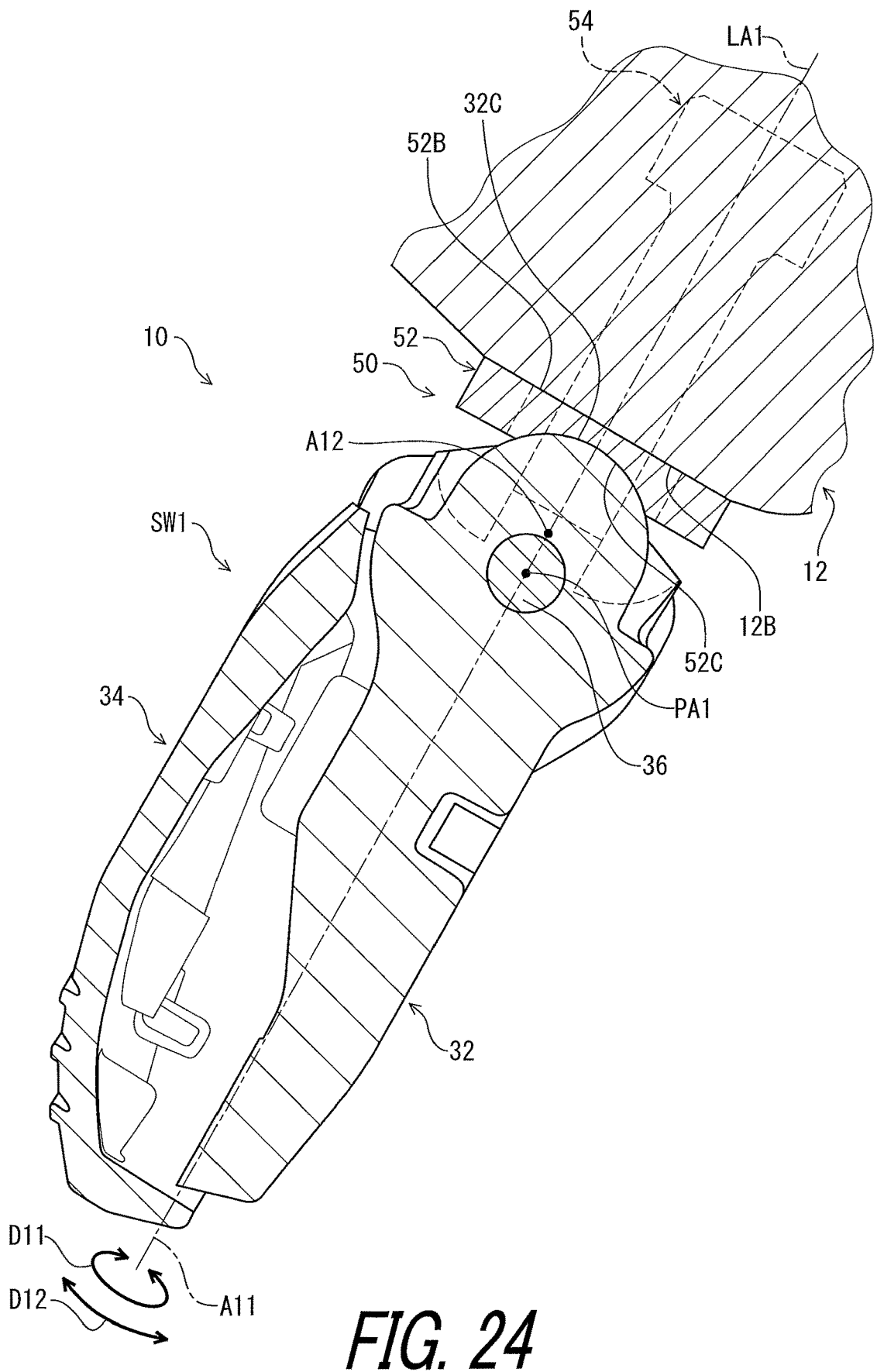
FIG. 24 is a cross-sectional view of an operating device in accordance with a modification.

In the modification depicted in FIG. 23, the first additional contact surface 52C has a curved convex shape. The first additional guide surface 32C has a curved concave shape. As seen in FIG. 24, however, the first additional contact surface 52C can have a curved concave shape if needed and/or desired. The first additional guide surface 32C can have a curved convex shape if needed and/or desired.

Figure 25:
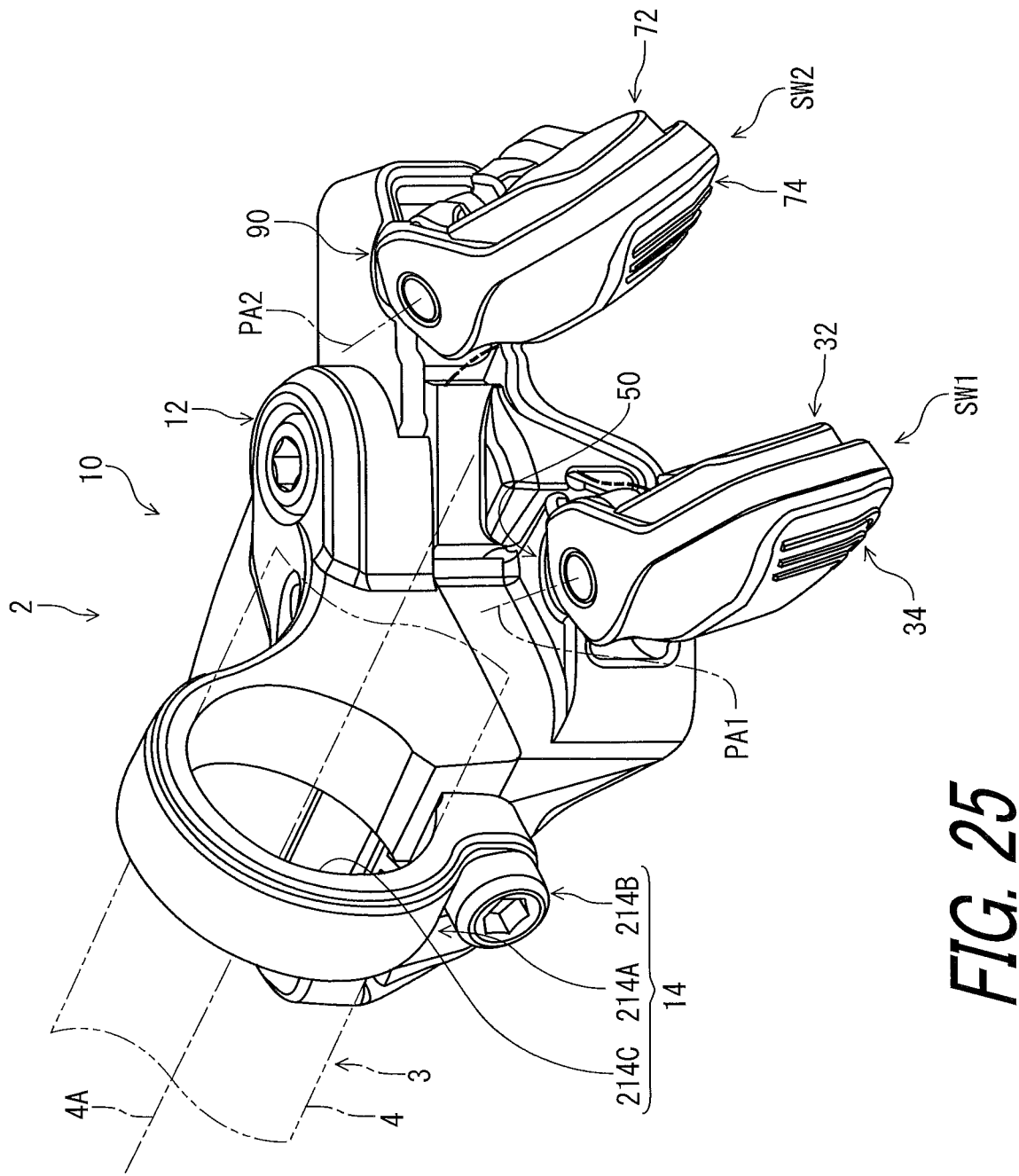
FIG. 25 is a perspective view of an operating device in accordance with a modification.

As seen in FIG. 25, the mounting structure 14 can have other structures such as a clamp. In the modification depicted in FIG. 25, the mounting structure 14 includes a clamp body 214A and a clamp screw 214B. The clamp body 214A includes an opening 214C through which the tubular part 4 of the vehicle body 3 is to extend. The clamp body 214A is fixedly coupled to the tubular part 4 by tightening the clamp screw 214B. The mounting structure 14 can be applied to the above embodiment and the modifications thereof.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device of a human-powered vehicle, comprising:
a base member mountable to a vehicle body of the human-powered vehicle;
a first switch unit configured to be activated in response to a first user operation, the first switch unit including:
a first base; and
a first operating member movably coupled to the first base from a first rest position to a first operated position in response to the first user operation; and
a first coupling structure coupling the base member and the first base such that the first base is adjustable relative to the base member in a first direction and is adjustable relative to the first coupling structure in a first additional direction different from the first direction, the first coupling structure including:
a first intermediate member at least partially provided between the base member and the first base to guide the first base relative to the base member in at least one of the first direction and the first additional direction; and
a first fastener configured to fasten the first base to the base member to hold the first intermediate member between the first base and the base member.

2. The operating device according to claim 1, wherein the first coupling structure has
a first fastening state where the first base and the first intermediate member are fastened to the base member by the first fastener, and
a first adjustable state where the first base is coupled to the base member by the first fastener to be movable relative to the base member in each of the first direction and the first additional direction.

3. The operating device according to claim 2, wherein the first base and the first intermediate member are movable relative to the base member in the first direction in the first adjustable state, and
the first base is movable relative to the first intermediate member in the first additional direction in the first adjustable state.

4. The operating device according to claim 1, wherein the first intermediate member is contactable with the base member and the first base.

5. The operating device according to claim 1, wherein the first intermediate member includes a first contact surface and a first additional contact surface,
the first contact surface is contactable with the base member to guide the first base and the first intermediate member relative to the base member in the first direction, and
the first additional contact surface is contactable with the first base to guide the first base relative to the first intermediate member in the first additional direction.

6. The operating device according to claim 5, wherein the first contact surface has a curved shape extending in the first direction.

7. The operating device according to claim 5, wherein the first additional contact surface has a flat shape extending in the first additional direction.

8. The operating device according to claim 1, wherein the first switch unit includes a first electrical switch at least partially provided between the first base and the first operating member to be activated in response to a movement of the first operating member relative to the first base.

9. The operating device according to claim 1, wherein the first fastener is at least partially provided in the first base.

10. The operating device according to claim 1, wherein the first fastener is at least partially provided in the first intermediate member.

11. The operating device according to claim 1, wherein the first base includes a first threaded hole, and
the first fastener includes a first externally threaded portion engaged with the first threaded hole.

12. The operating device according to claim 1, wherein the first intermediate member includes a first hole, and
the first fastener extends through the first hole.

13. The operating device according to claim 1, wherein the base member includes a first opening, and
the first fastener extends through the first opening.

14. The operating device according to claim 1, wherein the first coupling structure couples the base member and the first base such that the first base is adjustable relative to the base member about a first axis and is adjustable relative to the first coupling structure about a first additional axis different from the first axis,
the first direction is circumferentially defined about the first axis, and
the first additional direction is circumferentially defined about the first additional axis.

15. The operating device according to claim 14, wherein the first intermediate member is at least partially provided between the base member and the first base to guide the first base relative to the base member about at least one of the first axis and the first additional axis.

16. The operating device according to claim 14, wherein the first fastener extends along the first additional axis.

17. The operating device according to claim 14, wherein the first fastener has a first longitudinal center axis and extends along the first longitudinal center axis, and
the first longitudinal center axis extends along the first additional axis.

18. The operating device according to claim 17, wherein the first longitudinal center axis coincides with the first additional axis.

19. The operating device according to claim 14, wherein the first axis intersects with the first additional axis.

20. The operating device according to claim 14, wherein the first axis is perpendicular to the first additional axis.

21. The operating device according to claim 14, wherein the first switch unit includes a first electrical switch at least partially provided between the first base and the first operating member to be activated in response to a pivotal movement of the first operating member relative to the first base,
the first operating member is pivotally coupled to the first base about a first pivot axis from the first rest position to the first operated position in response to the first user operation, and
the first pivot axis is offset from the first axis.

22. The operating device according to claim 21, wherein the first pivot axis intersects with the first additional axis.

23. The operating device according to claim 21, wherein the first pivot axis is perpendicular to the first additional axis.

24. The operating device according to claim 1, wherein the first fastener is integrally provided as a one-piece unitary member.

25. The operating device according to claim 1, further comprising:
electronic circuitry provided to the base member; and
an electric cable electrically connecting the electronic circuitry and the first switch unit.

26. The operating device according to claim 1, further comprising
a first indicator provided to at least one of the base member, the first switch unit, and the first coupling structure to indicate a relative position between at least two of the base member, the first switch unit, and the first coupling structure.

27. The operating device according to claim 26, wherein
the first indicator includes a first mark, a second mark, and a third mark,
the first mark is provided to the base member,
the second mark is provided to the first switch unit, and
the third mark is provided to the first coupling structure.

28. The operating device according to claim 1, wherein
the first additional direction is non-parallel to the first direction.

29. The operating device according to claim 1, further comprising:
a second switch unit configured to be activated in response to a second user operation, the second switch unit including:
a second base; and
a second operating member movably coupled to the second base from a second rest position to a second operated position in response to the second user operation; and
a second coupling structure coupling the base member and the second base such that the second base is adjustable relative to the base member in a second direction and is adjustable relative to the second coupling structure in a second additional direction different from the second direction, the second coupling structure including:
a second intermediate member at least partially provided between the base member and the second base to guide the second base relative to the base member in at least one of the second direction and the second additional direction; and
a second fastener configured to fasten the second base to the base member to hold the second intermediate member between the second base and the base member.

* * * * *